United States Patent
Wu et al.

(10) Patent No.: US 12,543,037 B2
(45) Date of Patent: Feb. 3, 2026

(54) METHOD FOR OBTAINING IDENTIFIER OF TERMINAL DEVICE, APPARATUS, AND SYSTEM

(71) Applicant: HUAWEI TECHNOLOGIES CO., LTD., Shenzhen (CN)

(72) Inventors: Yizhuang Wu, Beijing (CN); He Li, Shanghai (CN); Li Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 632 days.

(21) Appl. No.: 17/955,614

(22) Filed: Sep. 29, 2022

(65) Prior Publication Data

US 2023/0013010 A1 Jan. 19, 2023

Related U.S. Application Data

(63) Continuation of application No. PCT/CN2020/082564, filed on Mar. 31, 2020.

(51) Int. Cl.
*H04M 1/66* (2006.01)
*H04W 8/20* (2009.01)
(Continued)

(52) U.S. Cl.
CPC .......... *H04W 12/041* (2021.01); *H04W 8/20* (2013.01); *H04W 76/11* (2018.02)

(58) Field of Classification Search
CPC ... H04W 12/06; H04W 12/069; H04W 12/12; H04W 12/041; H04W 76/11; H04W 88/04; H04W 8/20; H04W 12/043; H04W 12/02

See application file for complete search history.

(56) References Cited

U.S. PATENT DOCUMENTS 12,075,244 B2 * 8/2024 De Kievit ........... H04W 12/041
2017/0325270 A1 * 11/2017 Tenny ................... H04W 76/14
(Continued)

FOREIGN PATENT DOCUMENTS

| CN | 110602803 A | 12/2019 |
| CN | 110830989 A | 2/2020 |

(Continued)

OTHER PUBLICATIONS

3GPP Ts 33.501 V16.2.0 (Mar. 2020) Security architecture and procedures for 5G system (Release 16) p. 44 and figure 6.1.4.1a-1 (Year: 2020).*

(Continued)

*Primary Examiner* — Shantell L Heiber
(74) *Attorney, Agent, or Firm* — HAUPTMAN HAM, LLP

(57) ABSTRACT

A method for obtaining an identifier of a terminal device includes a key management network element receiving, from a first terminal device, a first key request including a first identifier, where the first identifier is an anonymous identifier or a temporary identifier of a second terminal device. The key management network element sends, to a unified data management network element, a first request including the first identifier. The unified data management network element determines a SUPI of the second terminal device based on the first identifier, and sends, to the key management network element, a first response including the SUPI. In response to an authorization check performed on the second terminal device based on the SUPI succeeds, the key management network element sends a first key response to the first terminal device, where the first key response includes a secure communication parameter.

19 Claims, 17 Drawing Sheets

(51) Int. Cl.
*H04W 12/041* (2021.01)
*H04W 76/11* (2018.01)

(56) References Cited

U.S. PATENT DOCUMENTS

| | | |
|---|---|---|
| 2018/0375647 A1 | 12/2018 | Yan |
| 2019/0174449 A1* | 6/2019 | Shan .................. H04W 60/04 |
| 2020/0092836 A1 | 3/2020 | Tiwari et al. |
| 2020/0196298 A1* | 6/2020 | Edge .................. H04W 4/029 |
| 2022/0295276 A1* | 9/2022 | Yang .................. H04L 9/3247 |

FOREIGN PATENT DOCUMENTS

| | | |
|---|---|---|
| EP | 3661241 A1 | 6/2020 |
| WO | 2019023825 A1 | 2/2019 |
| WO | 2019105695 A1 | 6/2019 |

OTHER PUBLICATIONS

Extended European Search Report issued in corresponding European Application No. 20928846.3, dated Apr. 12, 2023, pp. 1-7.

Ericsson, Solution for providing IMS voice and emergency services for SNPN subscribers reusing access level dentifiers and credentials.. 3GPP TSG-SA WG2 Meeting #136AH, Jan. 13-17, 2020, Incheon, Korea, S2-2000169, 5 pages.

3GPP TR 23.752 V0.3.0 (Jan. 2020), 3rd Generation Partnership Project; Technical Specification Group Services and System Aspects; Study on system enhancement for Proximity based Services (ProSe) in the 5G System (5GS) (Release 17), 73 pages.

3GPP TS 23.303 V15.1.0 (Jun. 2018), 3rd Generation Partnership Project; Technical Specification Group Services and System Aspects; Proximity-based services (ProSe); Stage 2(Release 15), 130 pages.

3GPP TS 33.536 V1.0.0 (Mar. 2020), 3rd Generation Partnership Project; Technical Specification Group Services and System Aspects; Security aspects of 3GPP support for advanced Vehicle-to-Everything (V2X) services (Release 16), 22 pages.

3GPP TS 33.501 V16.2.0 (Mar. 2020), 3rd Generation Partnership Project; Technical Specification Group Services and System Aspects; Security architecture and procedures for 5G system(Release 16), 227 pages.

International Search Report issued in corresponding International Application No. PCT/CN2020/082564, Jan. 5, 2021, pp. 1-11.

* cited by examiner

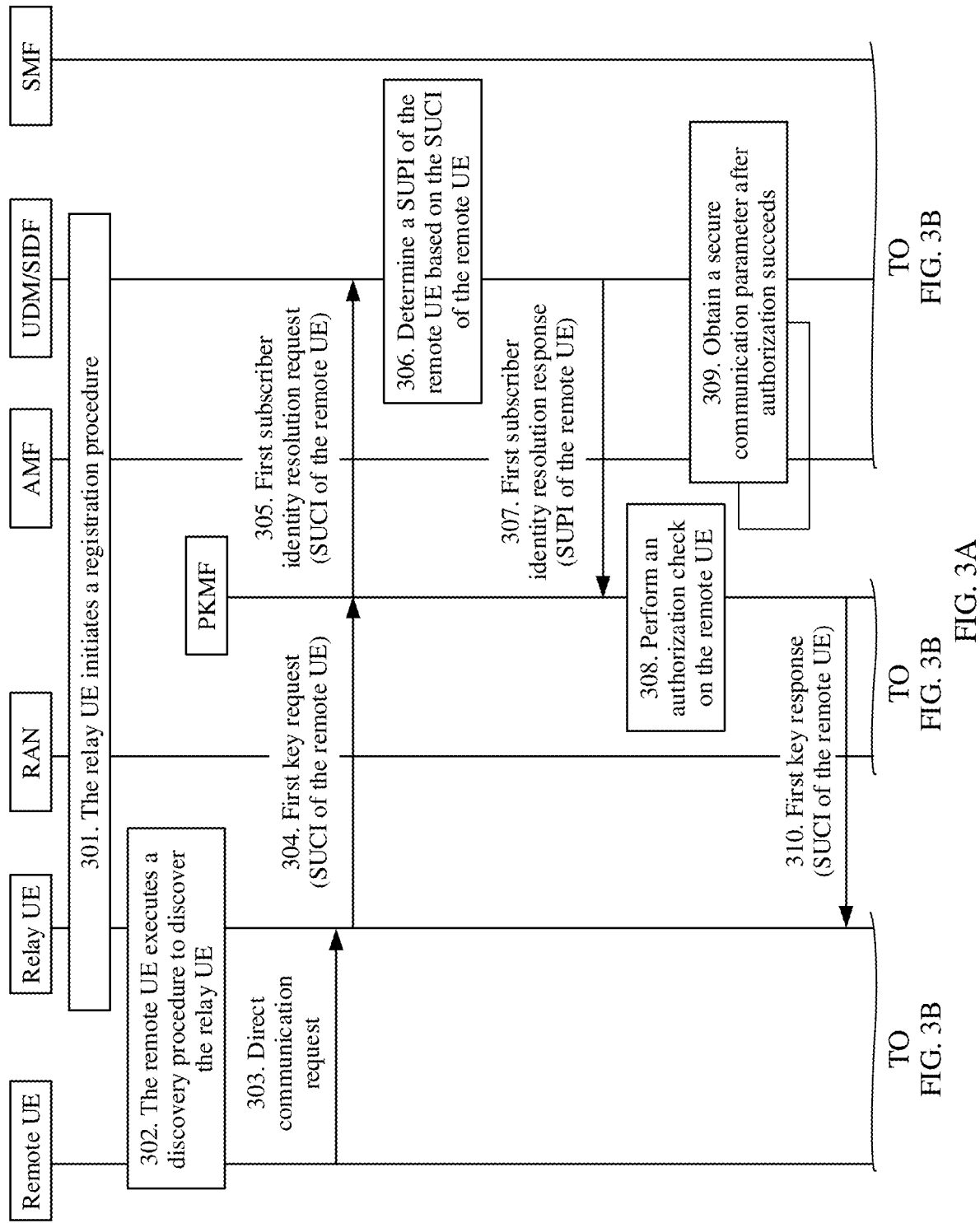

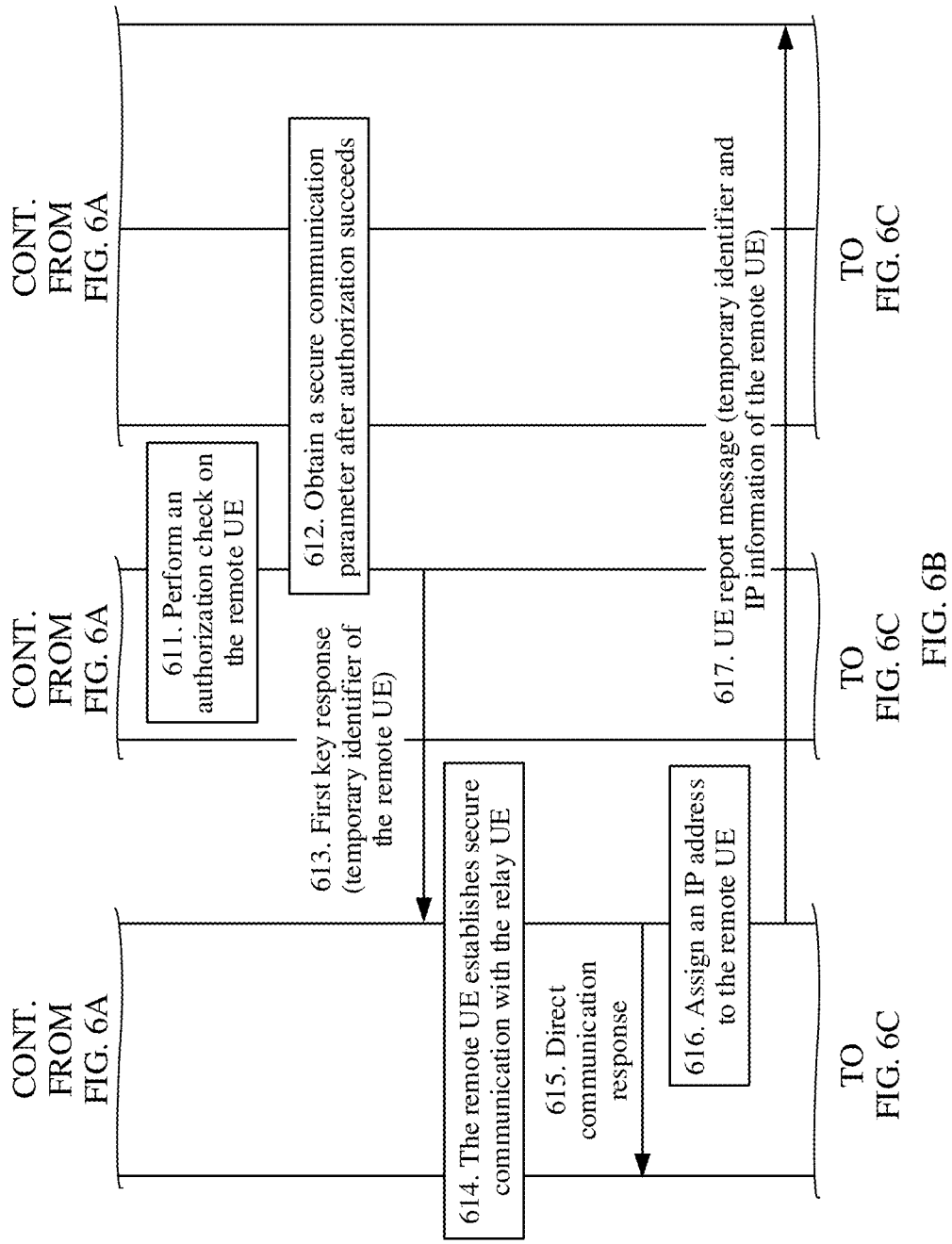

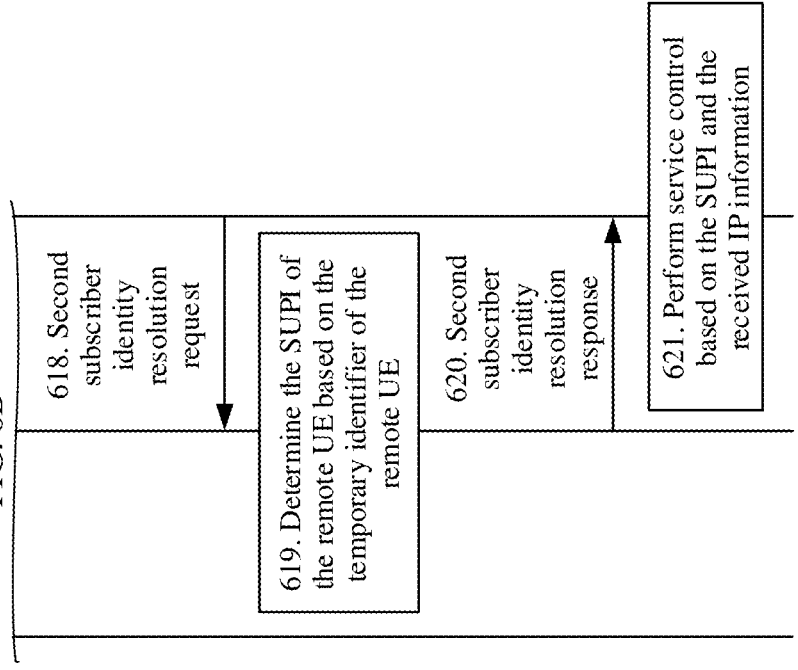

METHOD FOR OBTAINING IDENTIFIER OF TERMINAL DEVICE, APPARATUS, AND SYSTEM

CROSS-REFERENCE TO RELATED APPLICATIONS

This application is a continuation of International Application No. PCT/CN2020/082564, filed on Mar. 31, 2020, the disclosure of which is hereby incorporated in entirety by reference.

BACKGROUND

Currently, device to device (device to device, D2D) communication allows direct communication between user equipment (user equipment, UE).

When a remote device (remote UE) is located outside coverage of a communication network, or quality of communication between the remote device and an access network device in a communication network is relatively poor, the remote device establishes, based on D2D communication, indirect communication with the communication network via a relay device (relay UE). That is, the remote device obtains data from the communication network through communication between the remote device and the relay device, and interaction between the relay device and the communication network.

In a process in which the remote device establishes indirect communication with the communication network via the relay device, the relay device is to first obtain an identifier of the remote device, and report the identifier to the communication network, so that the communication network performs authentication and an authorization check based on the identifier of the remote device, or perform service control such as lawful interception based on the identifier of the remote device. In a 4th generation mobile communication technology (4th generation mobile communication technology, 4G) system, a remote device provides a subscription permanent identifier of the remote device for a relay device over an air interface using plaintext. Further, the remote device sends the received subscription permanent identifier of the remote device to a communication network. However, directly sending the subscription permanent identifier over the air interface using plaintext results in user privacy exposure.

SUMMARY

Some embodiments provide a method for obtaining an identifier of a terminal device, an apparatus, and a system, to resolve a problem of user privacy exposure resulting from a transmission manner of a subscription permanent identifier.

In some embodiments, a method for obtaining an identifier of a terminal device is discussed. The method is performed by a key management network element, and the method includes: The key management network element receives a first key request from a first terminal device, where the first key request includes a first identifier, and the first identifier is an anonymous identifier or a temporary identifier of a second terminal device. The key management network element resolves the first key request. If determining that the key request includes the first identifier, the key management network element is to determine a subscription permanent identifier of the second terminal device. The key management network element sends a first request to a unified data management network element, where the first request includes the first identifier. Subsequently, the key management network element receives a first response from the unified data management network element, where the first response includes the SUPI of the second terminal device. Then, the key management network element performs an authorization check on the second terminal device based on the SUPI of the second terminal device, and after the authorization check on the second terminal device succeeds, send a first key response to the first terminal device. The first key response includes a secure communication parameter, and the secure communication parameter is a parameter for establishing secure communication between the first terminal device and the second terminal device.

In some embodiments, the key management network element obtains the subscription permanent identifier of the second terminal device from the unified data management network element. The key management network element is to obtain the anonymous identifier or the temporary identifier of the second terminal device from the first terminal device, without a call for obtaining the subscription permanent identifier of the second terminal device from the first terminal device. This effectively ensures security of the subscription permanent identifier of the second terminal device, and further avoid user privacy exposure.

In some embodiments, the first response and the first key response further include a GPSI of the second terminal device, or includes the first identifier. The first response and the first key response further indicates the second terminal device by including the first identifier or the GPSI, to avoid user privacy exposure resulting from carrying the subscription permanent identifier.

In some embodiments, the first request and the first response is information in an existing interaction procedure between the key management network element and the unified data management network element. For example, the first request is a secure communication parameter obtaining request, and the first response is a secure communication parameter obtaining response. Alternatively, the first request and the first response is new information in an existing interaction procedure between the key management network element and the unified data management network element. A manner of setting the first request and the first response is more flexible, so that an application range is effectively extended.

In some embodiments, after the authorization check performed on the second terminal device based on a second identifier fails, the key management network element notifies the first terminal device to refuse or terminate to serve the second terminal device, or notifies the unified data management network element to delete a correspondence between the first identifier and the SUPI of the second terminal device. The key management network element notifies, in a timely and convenient manner, the first terminal device or the unified data management network element for a corresponding operation.

In some embodiments, the key management network element further sends a first indication to the unified data management network element, where the first indication indicates to store the correspondence between the first identifier and the SUPI of the second terminal device. The key management network element indicates, by sending the first indication, the unified data management network element to store the correspondence between the first identifier and the SUPI of the second terminal device, so that another network element obtains the SUPI of the second terminal device from the unified data management network element based on the first identifier.

In some embodiments, a method for obtaining an identifier of a terminal device is discussed. The method is performed by a unified data management network element. In the method, the unified data management network element receives a first request from a key management network element. The first request includes a first identifier, and the first identifier is an anonymous identifier or a temporary identifier of a second terminal device. After determining that the first request includes the first identifier, the unified data management network element obtains a SUPI of the second terminal device based on the first identifier. Subsequently, the unified data management network element sends a first response to the key management network element. The first response includes the SUPI of the second terminal device.

In the foregoing description, the key management network element conveniently obtains the SUPI of the second terminal device by interacting with the unified data management network element.

In some embodiments, when determining the SUPI of the second terminal device based on the anonymous identifier of the second terminal device, the unified data management network element obtains the SUPI of the second terminal device from a subscription identifier de-concealing network element based on the anonymous identifier of the second terminal device. In this way, a manner in which the unified data management network element obtains the SUPI of the second terminal device is more convenient.

In some embodiments, when determining the SUPI of the second terminal device based on the temporary identifier of the second terminal device, the unified data management network element determines the SUPI of the second terminal device based on a stored correspondence between a SUPI and a temporary identifier of a terminal device and based on the temporary identifier of the second terminal device. The unified data management network element stores the correspondence between the temporary identifier and the SUPI of the terminal device, so that the SUPI of the second terminal device is more conveniently provided for the key management network element.

In some embodiments, before determining the SUPI of the second terminal device based on the temporary identifier of the second terminal device, the unified data management network element is to first determine a temporary identifier allocated to the second terminal. The following two manners are introduced:

Manner 1: The unified data management network element allocates a temporary identifier to the second terminal device, then send the temporary identifier to the second terminal device via a proximity service network element, and further stores a correspondence between the SUPI and the temporary identifier of the second terminal device.

Manner 2: The unified data management network element alternatively obtains, from the proximity service network element, a temporary identifier allocated by the proximity service network element to the second terminal device, and store a correspondence between the SUPI and the temporary identifier of the second terminal device.

According to the foregoing method, the unified data management network element determines, in a plurality of different manners, the temporary identifier allocated to the second terminal for different scenarios.

In some embodiments, after obtaining the SUPI of the second terminal device based on the first identifier, the unified data management network element stores the correspondence between the first identifier and the SUPI of the second terminal device, so that another network element subsequently obtains the SUPI of the second terminal device from the unified data management network element based on the first identifier.

In some embodiments, the unified data management network element actively stores the correspondence between the first identifier and the SUPI of the second terminal device. Alternatively, the unified data management network element stores the correspondence between the first identifier and the SUPI of the second terminal device under indication of the key management network element. For example, the unified data management network element receives a first indication from the key management network element, where the first indication indicates to store the correspondence between the first identifier and the SUPI of the second terminal device. Subsequently, the unified data management network element stores the correspondence between the first identifier and the SUPI of the second terminal device. Alternatively, the unified data management network element first determines whether the correspondence between the first identifier and the SUPI of the second terminal device is to be stored, and then store the correspondence after determining that the correspondence between the first identifier and the SUPI of the second terminal device is to be stored. For example, the unified data management network element determines, based on an attribute of the second terminal device, whether the correspondence between the first identifier and the SUPI of the second terminal device is to be stored. There are a plurality of manners in which the unified data management network element determines to store the correspondence between the first identifier and the SUPI of the second terminal device, for different scenarios, thereby effectively extending an application scope.

In some embodiments, after storing the correspondence between the first identifier and the SUPI of the second terminal device, the unified data management network element may further delete, as notified by the key management network, the correspondence between the first identifier and the SUPI of the second terminal device, to save storage space.

In some embodiments, the first response includes the first identifier, or includes another identifier of the second terminal device. For example, the unified data management network element further determines a GPSI of the second terminal device based on the SUPI of the second terminal device, and include the GPSI of the second terminal device in the first response. In addition to the SUPI of the second terminal device, the first response further includes another identifier of the second terminal device, so that more information about the second terminal device is provided to the key management network element.

In some embodiments, the unified data management network element may further provide the SUPI of the second terminal device to another network element. Another network element is a session management network element or an access and mobility management network element. Descriptions are separately provided below:

(1) The unified data management network element receives a subscriber identity resolution request from the session management network element. The subscriber identity resolution request includes a second identifier, and the second identifier is one of the following: the anonymous identifier of the second terminal device, the temporary identifier of the second terminal device, or the GPSI of the second terminal device. Subsequently, the unified data management network element determines the SUPI of the second terminal device based on the second identifier. Then, the unified data management network element sends a subscriber identity resolution response to the session management network element. The subscriber identity resolution response includes the SUPI of the second terminal device.

(2) The unified data management network element may alternatively receive an identifier resolution request from the access and mobility management network element. The identifier resolution request includes a second identifier, and the second identifier is one of the following: the anonymous identifier of the second terminal device, the temporary identifier of the second terminal device, or the GPSI of the second terminal device. Subsequently, the unified data management network element determines the SUPI of the second terminal device based on the second identifier. Then, the unified data management network element sends an identifier resolution response to the access and mobility management network element. The identifier resolution response includes the SUPI of the second terminal device.

In some embodiments, the first request and the first response is information in an existing interaction procedure between the key management network element and the unified data management network element. For example, the first request is a secure communication parameter obtaining request, and the first response is a secure communication parameter obtaining response. Alternatively, the first request and the first response is new information in an existing interaction procedure between the key management network element and the unified data management network element. A manner of setting the first request and the first response is more flexible, so that an application range is effectively extended.

In some embodiments, the first response further includes the first identifier.

In some embodiments, a method for obtaining an identifier of a terminal device is discussed. In the method, a session management network element receives a UE report message from a first terminal device. The UE report message includes a second identifier and IP information allocated by the first terminal device to a second terminal device. The second identifier is one of the following: an anonymous identifier of the second terminal device, a temporary identifier of the second terminal device, or a GPSI of the second terminal device. The session management network element determines that the UE report message includes the second identifier and a SUPI of the second terminal device is to be obtained. The session management network element sends a subscriber identity resolution request to a unified data management network element, where the subscriber identity resolution request includes the second identifier. Then, the session management network element receives a subscriber identity resolution response from the unified data management network element, where the subscriber identity resolution response includes the SUPI of the second terminal device. After obtaining the SUPI, the session management network element performs service control on the second terminal device based on the SUPI and the IP information of the second terminal device.

In some embodiments, the session management network element obtains the subscription permanent identifier of the second terminal device from the unified data management network element. The session management network element is to obtain the anonymous identifier or the temporary identifier of the second terminal device from the first terminal device, without a call for obtaining the subscription permanent identifier of the second terminal device from the first terminal device. This effectively ensures security of the subscription permanent identifier of the second terminal device, and further avoid user privacy exposure.

In some embodiments, a method for obtaining an identifier of a terminal device is discussed. The method is executed by an access and mobility management network element. In the method, the access and mobility management network element receives a UE report message from a first terminal device. The UE report message includes a second identifier and IP information allocated by the first terminal device to a second terminal device. The second identifier is one of the following: an anonymous identifier of the second terminal device, a temporary identifier of the second terminal device, or a generic public subscription identifier GPSI of the second terminal device. Subsequently, the access and mobility management network element determines that the UE report message includes the second identifier and is to obtain a SUPI of the second terminal device. The access and mobility management network element sends an identifier resolution request to a unified data management network element, where the identifier resolution request includes the permanent subscriber identifier SUPI of the second terminal device. The access and mobility management network element receives an identifier resolution response from the unified data management network element, where the identifier resolution request includes the SUPI of the second terminal device. Then, the access and mobility management network element sends the SUPI and the IP information of the second terminal device to a session management network element.

In some embodiments, the access and mobility management network element obtains the subscription permanent identifier of the second terminal device from the unified data management network element, and then send the obtained subscription permanent identifier of the second terminal device to the session management network element. The first terminal device no longer is to provide the subscription permanent identifier of the second terminal device. This effectively ensures security of the subscription permanent identifier of the second terminal device, and further avoid user privacy exposure.

In some embodiments, a method for obtaining an identifier of a terminal device is discussed. The method is performed by a first terminal device. In the method, after determining that direct communication is to be established with a second terminal device, the first terminal device sends a first key request to a key management network element. The first key request includes a first identifier, and the first identifier is an anonymous identifier or a temporary identifier of the second terminal device. Subsequently, the first terminal device receives a first key response from the key management network element, where the first key response includes a secure communication parameter. Then, the first terminal device establishes secure communication with the second terminal device based on the secure communication parameter.

In some embodiments, the first terminal device obtains, from the key management network element based on the first identifier, the secure communication parameter for establishing secure communication with the second terminal device, and the first terminal device no longer is to provide the subscription permanent identifier of the second terminal device. This effectively ensures security of the subscription permanent identifier of the second terminal device, and further avoid user privacy exposure.

In some embodiments, the first key response further includes a GPSI of the second terminal device or the first identifier, indicating the second terminal device.

In some embodiments, a communication apparatus is discussed. The communication apparatus is used in a key management network element. For beneficial effects, refer to the description of the first aspect. Details are not described herein again. The apparatus has functions of implementing the behavior in the method example in the first aspect. The functions are implemented by hardware, or are implemented by hardware executing corresponding software. The hardware or the software includes one or more modules corresponding to the foregoing functions. In some embodiments, a structure of the apparatus includes a receiving unit, a processing unit, and a sending unit. These units performs corresponding functions in the method example in the first aspect. For details, refer to the detailed descriptions in the method example. Details are not described herein again.

In some embodiments, a communication apparatus is discussed. The communication apparatus is used in a unified data management network element. For beneficial effects, refer to the description of the second aspect. Details are not described herein again. The apparatus has functions of implementing the behavior in the method example in the second aspect. The functions are implemented by hardware, or are implemented by hardware executing corresponding software. The hardware or the software includes one or more modules corresponding to the foregoing function. In some embodiments, a structure of the apparatus includes a receiving unit, a processing unit, and a sending unit. These units performs corresponding functions in the method example in the second aspect. For details, refer to the detailed descriptions in the method example. Details are not described herein again.

In some embodiments, a communication apparatus is discussed. The communication apparatus is used in a session management network element. For beneficial effects, refer to the description of the third aspect. Details are not described herein again. The apparatus has functions of implementing the behavior in the method example in the third aspect. The functions are implemented by hardware, or are implemented by hardware executing corresponding software. The hardware or the software includes one or more modules corresponding to the foregoing function. In some embodiments, a structure of the apparatus includes a receiving unit, a processing unit, and a sending unit. These units performs corresponding functions in the method example in the third aspect. For details, refer to the detailed descriptions in the method example. Details are not described herein again.

In some embodiments, a communication apparatus is discussed. The communication apparatus is used in an access and mobility management network element. For beneficial effects, refer to the description of the fourth aspect. Details are not described herein again. The apparatus has functions of implementing the behavior in the method example in the fourth aspect. The functions are implemented by hardware, or are implemented by hardware executing corresponding software. The hardware or the software includes one or more modules corresponding to the foregoing function. In some embodiments, a structure of the apparatus includes a receiving unit, a processing unit, and a sending unit. These units performs corresponding functions in the method example in the fourth aspect. For details, refer to the detailed descriptions in the method example. Details are not described herein again.

In some embodiments, a communication apparatus is discussed. The communication apparatus is used in a first terminal device. For beneficial effects, refer to the description of the fifth aspect. Details are not described herein again. The apparatus has functions of implementing the behavior in the method example in the fifth aspect. The functions are implemented by hardware, or are implemented by hardware executing corresponding software. The hardware or the software includes one or more modules corresponding to the foregoing function. In some embodiments, a structure of the apparatus includes a receiving unit, a processing unit, and a sending unit. These units performs corresponding functions in the method example in the fifth aspect. For details, refer to the detailed descriptions in the method example. Details are not described herein again.

In some embodiments, a communication apparatus is discussed. The communication apparatus is used in a key management network element. For beneficial effects, refer to the description of the first aspect. Details are not described herein again. A structure of the communication apparatus includes a processor and a memory. The processor is configured to support the key management network element in performing corresponding functions in the method in the first aspect. The memory is coupled to the processor, and stores program instructions and data that are for the communication apparatus. The structure of the communication apparatus further includes a communication interface for communicating with another device.

In some embodiments, a communication apparatus is discussed. The communication apparatus is used in a unified data management network element. For beneficial effects, refer to the description of the second aspect. Details are not described herein again. A structure of the communication apparatus includes a processor and a memory. The processor is configured to support the unified data management network element in performing corresponding functions in the method in the second aspect. The memory is coupled to the processor, and stores program instructions and data that are for the communication apparatus. The structure of the communication apparatus further includes a communication interface for communicating with another device.

In some embodiments, a communication apparatus is discussed. The communication apparatus is used in a session management network element. For beneficial effects, refer to the description of the third aspect. Details are not described herein again. A structure of the communication apparatus includes a processor and a memory. The processor is configured to support the session management network element in performing corresponding functions in the method in the third aspect. The memory is coupled to the processor, and stores program instructions and data that are for the communication apparatus. The structure of the communication apparatus further includes a communication interface for communicating with another device.

In some embodiments, a communication apparatus is discussed. The communication apparatus is used in an access and mobility management network element. For beneficial effects, refer to the description of the fourth aspect. Details are not described herein again. A structure of the communication apparatus includes a processor and a memory. The processor is configured to support the access and mobility management network element in performing corresponding functions in the method in the fourth aspect. The memory is coupled to the processor, and stores program instructions and data that are for the communication apparatus. The structure of the communication apparatus further includes a communication interface for communicating with another device.

In some embodiments, a communication apparatus is discussed. The communication apparatus is used in a first terminal device. For beneficial effects, refer to the description of the first aspect. Details are not described herein again. A structure of the communication apparatus includes a processor and a memory. The processor is configured to support the first terminal device in performing corresponding functions in the method in the first aspect. The memory is coupled to the processor, and stores program instructions and data that are for the communication apparatus. The structure of the communication apparatus further includes a transceiver for communicating with another device.

In some embodiments, a communication system is discussed. For beneficial effects, refer to the descriptions in the foregoing aspects. Details are not described herein again. The communication system includes a key management network element and a unified data management network element.

The key management network element is configured to receive a first key request from a first terminal device, where the first key request includes a first identifier; and send a first request to the unified data management network element after determining that the first key request includes the first identifier, where the first request includes the first identifier, and the first identifier is an anonymous identifier or a temporary identifier of a second terminal device.

The unified data management network element is configured to receive the first request; after determining that the first request includes the first identifier, determine a subscription permanent identifier SUPI of the second terminal device based on the first identifier; and send a first response to the key management network element, where the first response includes the SUPI of the second terminal device.

The key management network element is further configured to receive the first response; perform an authorization check on the second terminal device based on the SUPI of the second terminal device; and after the authorization check on the second terminal device succeeds, send a first key response to the first terminal device. The first key response includes a secure communication parameter, and the secure communication parameter is used by the first terminal device to establish secure communication with the second terminal device.

In some embodiments, the first response and the first key response further include a GPSI of the second terminal device. The unified data management network element is further configured to determine the GPSI of the second terminal device based on the SUPI of the second terminal device.

In some embodiments, the first response and the first key response further include the first identifier. The unified data management network element stores a correspondence between the first identifier and the SUPI of the second terminal device.

In some embodiments, the key management network sends a first indication to the unified data management network element, where the first indication indicates to store the correspondence between the first identifier and the SUPI of the second terminal device. The unified data management network element is further configured to receive the first indication, and then store the correspondence between the first identifier and the SUPI of the second terminal device.

In some embodiments, after the authorization check performed on the second terminal device fails, the key management network element notifies the unified data management network element to delete the correspondence between the first identifier and the SUPI of the second terminal device.

The unified data management network element is further configured to delete, as notified by the key management network element, the correspondence between the first identifier and the SUPI of the second terminal device.

In some embodiments, when determining the SUPI of the second terminal device based on the anonymous identifier of the second terminal device, the unified data management network element obtains the SUPI of the second terminal device from a subscription identifier de-concealing network element based on the anonymous identifier of the second terminal device.

In some embodiments, when determining the SUPI of the second terminal device based on the temporary identifier of the second terminal device, the unified data management network element determines the SUPI of the second terminal device based on a stored correspondence between a SUPI and a temporary identifier of a terminal device and based on the temporary identifier of the second terminal device.

In some embodiments, before determining the SUPI of the second terminal device based on the temporary identifier of the second terminal device, the unified data management network element allocates the temporary identifier to the second terminal device, send the temporary identifier to the second terminal device via a proximity service network element, and store a correspondence between the SUPI and the temporary identifier of the second terminal device. Alternatively, the unified data management network element obtains, from a proximity service network element, the temporary identifier allocated by the proximity service network element to the second terminal device, and store a correspondence between the SUPI and the temporary identifier of the second terminal device.

In some embodiments, the system further includes a session management network element.

The session management network element is configured to receive a UE report message from the first terminal device, where the UE report message includes a second identifier and IP information allocated by the first terminal device to the second terminal device, and the second identifier is one of the following: the anonymous identifier, the temporary identifier, or the GPSI; and after determining that the UE report message includes the second identifier, send a subscriber identity resolution request to the unified data management network element, where the subscriber identity resolution request includes the second identifier.

The unified data management network element is further configured to receive the subscriber identity resolution request, determine the SUPI of the second terminal device based on the second identifier, and send a subscriber identity resolution response to the session management network element, where the subscriber identity resolution response includes the SUPI of the second terminal device.

The session management network element is further configured to receive the subscriber identity resolution response, and perform service control on the second terminal device based on the SUPI of the second terminal device and the IP information.

In some embodiments, the system further includes an access and mobility management network element.

The access and mobility management network element is configured to receive the UE report message from the first terminal device, where the UE report message includes the second identifier and the IP information allocated by the first terminal device to the second terminal device, and the second identifier is one of the following: the anonymous identifier of the second terminal device, the temporary identifier of the second terminal device, or the GPSI of the second terminal device; and send an identifier resolution request to the unified data management network element, where the identifier resolution request includes the second identifier.

The unified data management network element is further configured to receive the identifier resolution request, determine the SUPI of the second terminal device based on the second identifier, and send an identifier resolution response to the access and mobility management network element, where the identifier resolution response includes the SUPI of the second terminal device.

The access and mobility management network element is further configured to receive the identifier resolution response, and send the SUPI of the second terminal device and the IP information to the session management network element.

In some embodiments, the system further includes the first terminal device.

The first terminal device is configured to send the first key request to the key management network element, receive the first key response from the key management network element, and after establishing secure communication with the second terminal device based on the secure communication parameter, send the UE report message to the session management network element via the access and mobility management network element.

In some embodiments, the system further includes the proximity service network element. The proximity service network element is configured to allocate the temporary identifier to the second terminal device, and send the temporary identifier to the unified data management network element.

In some embodiments, a computer-readable storage medium is discussed. The computer-readable storage medium stores instructions. When the instructions are run on a computer, the computer is enabled to perform the method in each of the foregoing aspects.

In some embodiments, a computer program product including instructions is discussed. When the computer program product runs on a computer, the computer is enabled to perform the method in each of the foregoing aspects.

In some embodiments, a computer chip is discussed. The chip is connected to a memory. The chip is configured to read and execute a software program stored in the memory, to perform the method in each of the foregoing aspects.

BRIEF DESCRIPTION OF DRAWINGS

FIG. 3A and FIG. 3B are a schematic diagram of a first method for obtaining an identifier of a terminal device according to some embodiments;

FIG. 6A to FIG. 6C are a schematic diagram of a fourth method for obtaining an identifier of a terminal device according to some embodiments;

DESCRIPTION OF EMBODIMENTS

Figure 1:
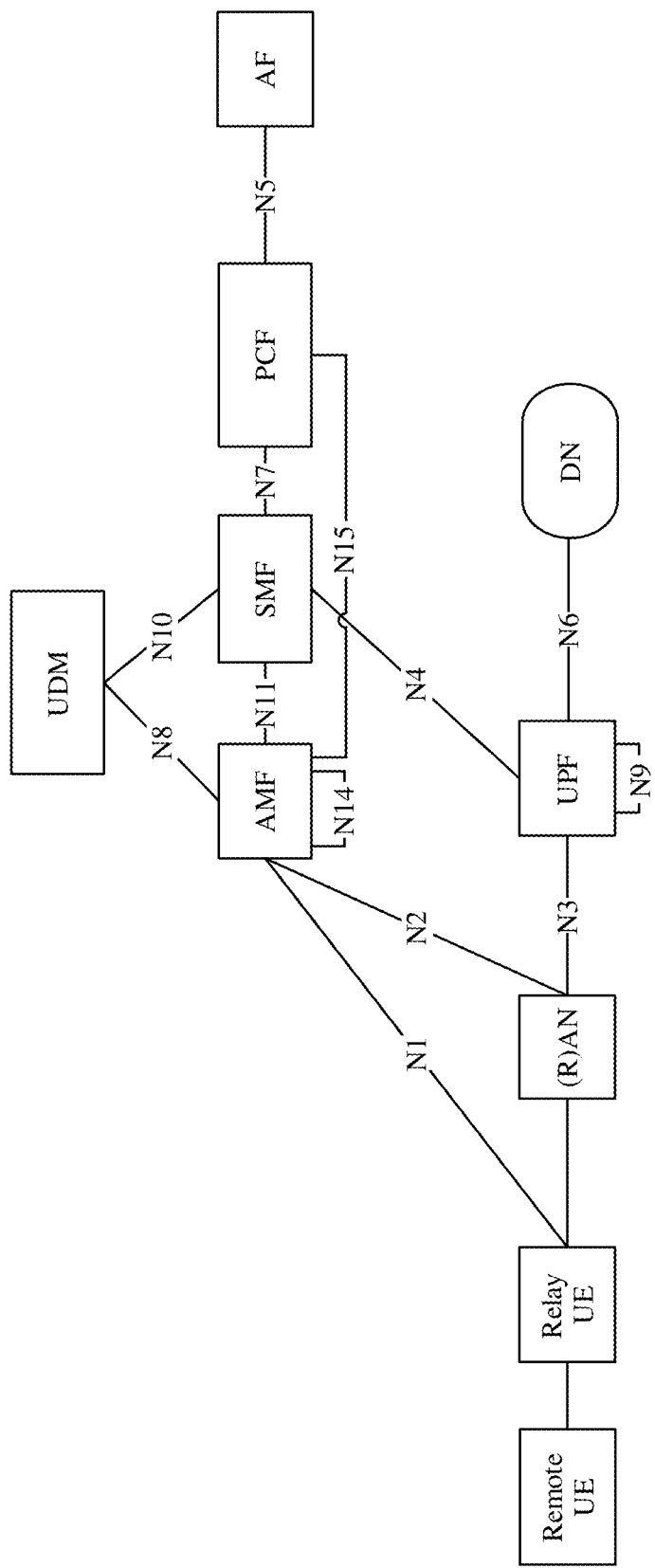
FIG. 1 is an architectural diagram of a system according to some embodiments.

FIG. 1 is a schematic diagram of a network architecture in accordance with some embodiments. The network architecture is a network architecture of a 5G system. A network element in the 5G architecture includes a terminal device (user equipment, UE). The network architecture further includes a radio access network (radio access network, RAN), an access and mobility management function (access and mobility management function, AMF) network element, a session management function (session management function, SMF) network element, a user plane function (user plane function, UPF) network element, a unified data management (unified data management, UDM) network element, an application function (application function, AF) network element, a data network (data network, DN), and the like.

The terminal device is a device having a wireless transceiver function, and is deployed on land, including an indoor or outdoor device, a handheld device, or an in-vehicle device; or is deployed on water (for example, on a ship); or is deployed in the air (for example, on an airplane, a balloon, or a satellite). The terminal device is a mobile phone (mobile phone), a tablet computer (pad), a computer having the wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. In some embodiments, there are two types of terminal devices: remote UE (for example, a second terminal device) and relay UE (for example, a first terminal device). The remote UE is UE communicating with a data network via the relay UE. The relay UE is UE capable of directly communicating with the data network.

In some embodiments, the remote UE sends an anonymous identifier or an allocated temporary identifier of the remote UE to the relay UE, and the relay UE sends, to a PKMF network element, the anonymous identifier or the allocated temporary identifier sent by the remote UE.

A main function of the RAN is to control a user to wirelessly access a mobile communication network. The RAN is a part of a mobile communication system. The RAN implements a radio access technology. Conceptually, the RAN resides between a device (for example, a mobile phone, a computer, or any remote controller) and a core network, and provides a connection between the device and the core network.

The AMF network element is responsible for access management and mobility management of a terminal. In application, the AMF network element includes a mobility management function of an MME in an LTE network architecture, and further includes an access management function.

The SMF network element is responsible for session management such as user session establishment.

The UPF network element is a user-plane function network element, and is mainly responsible for connecting to an external network. The UPF network element includes related functions of a serving gateway (serving gateway, SGW) and a public data network gateway (public data network gateway, PDN-GW) in LTE.

The DN is a network responsible for providing services for the terminal. For example, some DNs provide a network access function for the terminal, and some other DNs provide a text messaging function for the terminal.

The UDM network element stores subscription information of a user, and implement a function similar to that of an HSS in 4G. In some embodiments, the UDM network element determines a subscription permanent identifier (subscription permanent identifier, SUPI) of the terminal device based on the anonymous identifier or the temporary identifier of the remote UE.

The AF network element is a third-party application control platform, or is an operator-specific device. The AF network element provides services for a plurality of application servers.

Although not shown, a core network element further includes a proximity-based services key management function (proximity-based services key management function, PKMF) network element, a subscription identifier de-concealing function (subscription identifier de-concealing function, SIDF) network element, a proximity-based services (proximity-based Services, ProSe) network element, a unified data repository (unified data repository, UDR) network element, and a bootstrapping server function (bootstrapping server function, BSF) network element.

The PKMF network element is configured to manage a key for UE in ProSe communication. The PKMF network element is deployed independently, or is co-deployed with another network element. For example, the PKMF network element is co-deployed with the ProSe network element.

In some embodiments, the SIDF network element is capable of decrypting a SUCI to obtain a SUPI. The SIDF network element is deployed independently, or is co-deployed with another network element. For example, the SIDF network element is co-deployed with the UDM network element.

The ProSe network element supports network-related actions for ProSe. The ProSe network element has the following functions: a direct provisioning function and a direct discovery name management function. The direct provisioning function is used to provide UE with parameters, for example, a temporary identifier. The direct discovery name management function is used for opening ProSe direct discovery to allocate ProSe application codes. In some embodiments, the ProSe network element allocates a temporary identifier to the UE, notify the UE of the allocated temporary identifier, and sends, to the UDM network element, the temporary identifier that is allocated to the UE.

The UDR network element is mainly configured to store user-related subscription data, policy data, structured data used for exposure, and application data.

In some embodiments, the BSF network element provides, to the PKMF network element, a secure communication parameter for establishing secure communication between the relay UE and the remote UE.

In some embodiments, a key management network element receives, from a first terminal device, a first key request including a first identifier, where the first identifier is an anonymous identifier or a temporary identifier of a second terminal device. After determining that the first key request includes the first identifier, the key management network element requests, based on the first identifier, to obtain a subscription permanent identifier of the second terminal device from a unified data management network element. Then, the key management network element performs an authorization check on the second terminal device based on the subscription permanent identifier of the second terminal device. After the authorization check succeeds, the key management network element sends, to the first terminal device, a secure communication parameter for establishing secure communication. In some embodiments, the first terminal device no longer is to provide the subscription permanent identifier of the second terminal device to the key management network element. The key management network element obtains the subscription permanent identifier of the second terminal device from the unified data management network element for authorization check, ensuring security of the subscription permanent identifier of the second terminal device.

Figure 2:
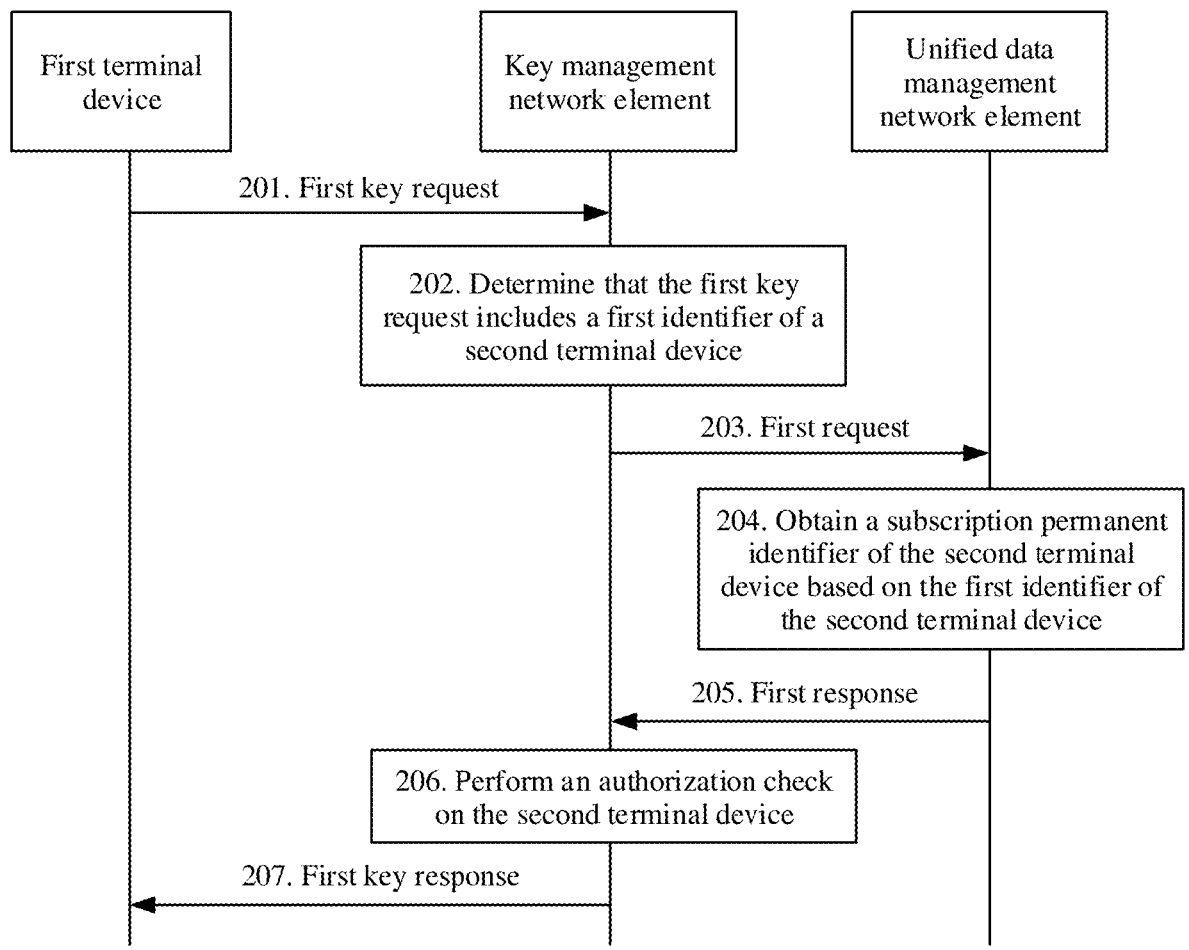
FIG. 2 is a schematic diagram of a method for obtaining an identifier of a terminal device according to some embodiments.

The following describes a method for obtaining an identifier of a terminal device according to some embodiments with reference to the accompanying drawings. Refer to FIG. 2. The method includes the following steps:

Step 201. A key management network element receives a first key request from a first terminal device, where the first key request includes a first identifier, and the first identifier is an anonymous identifier or a temporary identifier of a second terminal device.

Step 202. The key management network element determines that the first key request includes the first identifier.

After receiving the first key request, the key management network element resolves the first key request. After determining that the first key request includes the first identifier, the key management network element obtains a subscription permanent identifier of the second terminal device by performing step 203.

Step 203. The key management network element sends a first request to a unified data management network element, where the first request includes the first identifier.

Step 204. The unified data management network element receives the first request from the key management network element, and obtains the subscription permanent identifier of the second terminal device based on the first identifier.

Step 205. The unified data management network element sends a first response to the key management network element, where the first response includes the subscription permanent identifier of the second terminal device.

Step 206. The key management network element performs an authorization check on the second terminal device based on the subscription permanent identifier of the second terminal device.

Step 207. After the authorization check on the second terminal device succeeds, the key management network element sends a first key response to the first terminal device, where the first key response includes a secure communication parameter.

When the second terminal device is to communicate with a data network, the second terminal device initiates a direct communication request to the first terminal device. The direct communication request includes the anonymous identifier or the temporary identifier of the second terminal device.

The anonymous identifier or the temporary identifier is an identifier pre-allocated to the second terminal device. The anonymous identifier is a permanent identifier concealing a terminal device. A network element obtains, based on the anonymous identifier, information about the terminal device concealing in the anonymous identifier. For example, the anonymous identifier is a subscription concealed identifier (subscription concealed identifier, SUCI), and the SUCI is a privacy preserving identifier containing the subscription permanent identifier (subscription permanent identifier, SUPI).

In some embodiments, the temporary identifier is a short-validity-period identifier that is allocated by a proximity service network element (such as a ProSe network element) or the unified data management network element to the second terminal device.

For example, the proximity service network element sends the temporary identifier to the second terminal device in a registration process of the second terminal device. That is, the proximity service network element allocates the temporary identifier to the second terminal device when receiving a registration request sent by the second terminal device. The proximity service network element sends the registration request response message including the temporary identifier to the second terminal device. After allocating the temporary identifier to the second terminal device, the proximity service network element sends the temporary identifier of the second terminal device to the unified data management network element. After receiving the temporary identifier of the second terminal device, the unified data management network element locally stores a correspondence between the temporary identifier and the subscription permanent identifier of the second terminal device.

In another example, the unified data management network element alternatively allocates the temporary identifier to the second terminal device in a registration process of the second terminal device. After allocating the temporary identifier to the second terminal device, the unified data management network element locally stores a correspondence between the temporary identifier and the subscription permanent identifier of the second terminal device. The unified data management network element further sends the temporary identifier of the second terminal device to the proximity service network element. For example, the proximity service network element sends the received temporary identifier to the second terminal device.

In some embodiments, the proximity service network element or the unified data management network element periodically updates the temporary identifier of the second terminal device. After updating the temporary identifier of the second terminal device, the proximity service network element or the unified data management network element sends an updated temporary identifier of the second terminal device to the second terminal device. If the proximity service network element updates the temporary identifier of the second terminal device, the proximity service network element sends the updated temporary identifier of the second terminal device to the unified data management network element, so that the unified data management network element updates a locally stored temporary identifier of the second terminal device.

After receiving the direct communication request, to determine whether the second terminal device is authorized to communicate via the first terminal device, the first terminal device performs step 201 of sending the first key request to the key management network element, to request the key management network element to perform an authorization check on the first terminal device.

The key management network element resolves the first key request. If the key management network element determines that an identifier included in the first key request is the anonymous identifier or the temporary identifier of the second terminal device, the key management network element is unable to perform an authorization check on the second terminal device based on the anonymous identifier or the temporary identifier of the second terminal device. The key management network element performs step 203 of sending the first request including the first identifier, to request to obtain the subscription permanent identifier of the second terminal device from the unified data management network element.

After receiving the first request, the unified data management network element determines the subscription permanent identifier of the second terminal device based on the anonymous identifier or the temporary identifier of the second terminal device, and feed back the first response including the subscription permanent identifier of the second terminal device to the key management network element.

The first request and the first response is information in an existing interaction procedure between the key management network element and the unified data management network element.

For example, the first request is a secure communication parameter obtaining request. The secure communication parameter obtaining request requests, from the unified data management network element, to obtain a secure communication parameter for establishing secure communication between the first terminal device and the second terminal device. The key management network element carries the anonymous identifier or the temporary identifier of the second terminal device in the secure communication parameter obtaining request. The secure communication parameter obtaining request further requests to obtain the subscription permanent identifier of the second terminal device from the unified data management network element.

Correspondingly, the first response is a secure communication parameter obtaining response. The secure communication parameter obtaining response includes the secure communication parameter for establishing secure communication between the first terminal device and the second terminal device and the subscription permanent identifier of the second terminal device.

The foregoing description is provided by using an example in which the first request is the secure communication parameter obtaining request and the first response is the secure communication parameter obtaining response. Types of the first request and the first response are not limited in some embodiments. The first request and the first response alternatively is other information in the existing interaction procedure between the key management network element and the unified data management network element.

Alternatively, the first request and the first response is new information in the interaction procedure between the key management network element and the unified data management network element, which are dedicated to request to obtain the subscription permanent identifier of the second terminal device. For example, the first request is a first subscriber identity resolution request, and the first response is a first subscriber identity resolution response.

The following describes a manner in which the unified data management network element determines the subscription permanent identifier of the second terminal device based on the anonymous identifier or the temporary identifier of the second terminal device.

1. The unified data management network element determines the subscription permanent identifier of the second terminal device based on the anonymous identifier of the second terminal device.

The unified data management network element locally stores a correspondence between the anonymous identifier and the subscription permanent identifier of the second terminal device. The unified data management network element determines the subscription permanent identifier of the second terminal device based on the stored correspondence and the anonymous identifier of the second terminal device.

The unified data management network element alternatively obtains the subscription permanent identifier of the second terminal device from another network element based on the anonymous identifier of the second terminal device. Another network element is a subscription identifier de-concealing function network element or a unified data repository network element.

After obtaining the subscription permanent identifier of the second terminal device from another network element, the unified data management network element directly stores the correspondence between the anonymous identifier and the subscription permanent identifier of the second terminal device. Alternatively, the unified data management network element first determines an attribute of the second terminal device, and determine, based on the attribute of the second terminal device, whether to store the correspondence between the anonymous identifier and the subscription permanent identifier of the second terminal device.

For example, the unified data management network element queries for subscription information of the second terminal device based on the subscription permanent identifier of the second terminal device, to determine whether the second terminal device is a commercial (commercial) subscriber. If the second terminal device is a commercial subscriber, the unified data management network element stores the correspondence. If the second terminal device is not a commercial subscriber, for example, the second terminal device is a public safety (mission critical) subscriber, the unified data management network element does not store the correspondence.

In the foregoing description, the unified data management network element actively stores the correspondence. Certainly, in application, the unified data management network element alternatively stores the correspondence under indication of the key management network element.

For example, the key management network element sends a first indication to the unified data management network element. The first indication indicates the unified data management network element to store the correspondence between the anonymous identifier and the subscription permanent identifier of the second terminal device. A manner and a time for sending the first indication by the key management network are not limited. The key management network element separately sends the first indication to the unified data management network element. For example, the key management network element sends the first indication to the unified data management network element in advance, or the key management network element sends the first indication to the unified data management network element after sending the first request, or the key management network element sends the first indication after receiving the first response. Alternatively, the key management network element includes the first indication in a message that is to be sent to the unified data management network element. For example, the key management network element includes the first indication in the first request.

2. The unified data management network element determines the subscription permanent identifier of the second terminal device based on the temporary identifier of the second terminal device.

The unified data management network element locally stores the correspondence between the temporary identifier and the subscription permanent identifier of the second terminal device. The unified data management network element determines the subscription permanent identifier of the second terminal device based on the stored correspondence and the temporary identifier of the second terminal device.

The unified data management network element alternatively stores the correspondence between the temporary identifier and the subscription permanent identifier of the second terminal device to another network element, for example, a unified data repository network element. The unified data management network element obtains the correspondence from the another network element, and then determine the subscription permanent identifier of the second terminal device based on the temporary identifier of the second terminal device.

Optionally, after obtaining the subscription permanent identifier of the second terminal device, the unified data management network element further determines a generic public subscription identifier (generic public subscription identifier, GPSI) of the second terminal device.

A manner in which the unified data management network element determines the generic public subscription identifier of the second terminal device based on the subscription permanent identifier of the second terminal device is similar to the manner in which the unified data management network element determines the subscription permanent identifier of the second terminal device based on the first identifier. For details, refer to the foregoing content. Details are not described herein again.

After receiving the first response from the unified data management network element and obtaining the subscription permanent identifier of the second terminal device, the key management network element performs an authorization check on the second terminal device based on the subscription permanent identifier of the second terminal device.

The key management network element stores an identifier set. Identifiers in the identifier set are subscription permanent identifiers of terminal devices that directly communicates with the first terminal device. In other words, the terminal devices indicated by the subscription permanent identifiers in the identifier set establishes a connection to a communication system for data exchange via the first terminal device, and is authorized to communicate via the first terminal device.

The key management network element performs an authorization check on the second terminal device based on the identifier set and the subscription permanent identifier of the second terminal device. In other words, the key management center determines whether the subscription permanent identifier of the second terminal device is an identifier in the identifier set.

When the subscription permanent identifier of the second terminal device is an identifier in the identifier set, the authorization check performed by the key management network element on the second terminal device succeeds.

If the first response is the secure communication parameter obtaining response, the key management network element directly performs step 207.

If the first response is the first subscriber identity resolution response, after the authorization check performed by the key management network element on the second terminal device succeeds, the key management network element sends the secure communication parameter obtaining request to the unified data management network element, obtain a secure communication parameter from the unified data management network element, and then perform step 207. The first key response further includes the first identifier and the generic public subscription identifier of the second terminal device. The second terminal device is indicated using the first identifier or the generic public subscription identifier. In other words, the secure communication parameter included in the first key response is a secure communication parameter for establishing secure communication with the second terminal device.

Optionally, the key management network element interacts with the unified data management network element to obtain the subscription permanent identifier of the second terminal device. After the authorization check performed by the key management network element on the second terminal device succeeds, the key management network element alternatively interacts with a bootstrapping server function network element (BSF network element) based on the subscription permanent identifier of the second terminal device, to obtain the secure communication parameter.

When the subscription permanent identifier of the second terminal device is not an identifier in the identifier set, the authorization check performed by the key management network element on the second terminal device fails, and the key management network element sends a second indication to the first terminal device. The second indication indicates that the authorization check performed on the second terminal device fails. After receiving the second indication, the first terminal device terminates or refuse to communicate with the second terminal device, not to serve the second terminal device.

The key management network element further notifies the unified data management network element to delete the correspondence between the anonymous identifier and the subscription permanent identifier of the second terminal device. The unified data management network element deletes, as notified by the key management network element, the stored correspondence between the anonymous identifier and the subscription permanent identifier of the second terminal device.

The authorization check performed by the key management network element on the second terminal device succeeds. After receiving the first key response, the first terminal device establishes secure communication with the second terminal device based on the secure communication parameter included in the first key response. In a process of establishing the secure communication, the first terminal device sends a direct security mode command to the second terminal device. The direct security mode command includes key-related information, and the key-related information is determined based on the secure communication parameter (for example, the secure communication parameter includes the key-related information). After receiving the direct security mode command, the second terminal device generates a security key based on the key-related information. The security key is used for encryption and/or integrity protecting data exchanged between the second terminal device and the first terminal device. After generating the security key, the second terminal device sends a direct security mode complete message to the first terminal device, to notify the first terminal device that a direct security mode is completed.

After the first terminal device establishes secure communication with the second terminal device, the first terminal device sends a direct communication response to the second terminal device in response to the direct communication request sent by the second terminal device.

The first terminal device allocates an Internet Protocol (Internet Protocol, IP) address to the second terminal device. The IP address is used by the second terminal device for data communication with a data network via the first terminal device. The IP address is an Internet Protocol version 6 (internet protocol version 6, IPv6) prefix or an IPv4 address.

A process in which the second terminal device performs, based on the IP address, data communication with the data network via the first terminal device is as follows: The second terminal device performs data encapsulation using an IP address (for example, the IPv6 prefix or the IPv4 address) allocated by the first terminal device to the second terminal device, to generate a data packet, and sends the data packet to the first terminal device.

For a data packet generated through encapsulation using the IPv4 address, after receiving the data packet, the first terminal device translates the IPv4 address of the data packet into an IPv4 address of a PDU session (the IPv4 address of the PDU session is assigned by a network side to the first terminal device). The PDU session is a PDU session for a relay service. The first terminal device sends the data packet with the translated IPv4 address through a port. The data packet further includes a port number of the port. The port is allocated by the first terminal device for transmission of the data packet of the second terminal device.

For a data packet generated through encapsulation using the IPv6 prefix, the first terminal device directly sends the data packet to a PDU session.

When receiving, from the data network, a data packet that is to be sent to the second terminal device, and resolving an IP address of the data packet or a port number of the data packet, the first terminal device determines that the data packet is the data packet that is to be sent to the second terminal device. The first terminal device sends the data packet to the second terminal device. For the data packet generated through encapsulation using the IPv4 address, the first terminal device determines the second terminal device based on the port number of the data packet.

After assigning the IP address to the second terminal device, the first terminal device sends, to a session management network element, a UE report message including IP information of the second terminal device, so that the session management network element performs service control based on the IP information, such as lawful interception and traffic statistics.

If the IP address assigned by the first terminal device to the second terminal device is the IPv6 prefix, the IP information is the IPv6 prefix.

If the IP address assigned by the first terminal device to the second terminal device is the IPv4 address, because the first terminal device generally is to assign, to the second terminal device, a port number for transmission of data packets, the first terminal device subsequently determines, based on the port number included in the data packet, that the data packet is from the second terminal device, and the IP information is a port number range assigned by the first terminal device to the second terminal device.

The UE report message further includes a second identifier. The second identifier is any one of the following identifiers for identifying the second terminal device: the anonymous identifier of the second terminal device, the temporary identifier of the second terminal device, and the generic public subscription identifier of the second terminal device. The second identifier in the UE report message is obtained by the first terminal device from the key management network element, or is obtained from the second terminal device. After receiving the UE report message, the session management network element determines that the UE report message includes the second identifier. To determine a real identity of the second terminal device, the session management network element requests the subscription permanent identifier of the second terminal device from the unified data management network element.

For example, the session management network element sends a second subscriber identity resolution request to the unified data management network element. The second subscriber identity resolution request includes the second identifier. After receiving the second subscriber identity resolution request, the unified data management network element determines the subscription permanent identifier of the second terminal device based on the second identifier, and sends, to the session management network element, a second subscriber identity resolution response including the subscription permanent identifier of the second terminal device. After receiving the second subscriber identity resolution response, the session management network element obtains the subscription permanent identifier of the second terminal device.

For a manner in which the unified data management network element determines the subscription permanent identifier of the second terminal device based on the second identifier, refer to the foregoing description. Details are not described herein again.

In some embodiments, the second identifier alternatively is the subscription permanent identifier of the second terminal device. In this case, the session management network element does not have a call to obtain the subscription permanent identifier from the unified data management network element, and directly performs service control based on the IP information, such as lawful interception and traffic statistics.

In the foregoing description, the session management network element is to interact with the unified data management network element to obtain the subscription permanent identifier of the second terminal device. In some embodiments, an access and mobility management network element also interacts with the unified data management network element to obtain the subscription permanent identifier of the second terminal device, and then sends the obtained subscription permanent identifier of the second terminal device to the session management network element.

For example, the first terminal device sends an N1 message to the access and mobility management network element, where the N1 message includes a second identifier and an N1 SM message, and the N1 SM message includes IP information. After receiving the second identifier, the access and mobility management network element initiates an identifier resolution procedure, and send an identifier resolution request including the second identifier to the unified data management network element. After receiving the identifier resolution request, the unified data management network element determines the subscription permanent identifier of the second terminal device based on the second identifier. Subsequently, the unified data management network element sends an identifier resolution response including the subscription permanent identifier of the second terminal device to the access and mobility management network element. The access and mobility management network element sends the subscription permanent identifier of the second terminal device and the N1 SM message to the session management network element. The subscription permanent identifier of the second terminal device and the N1 SM message is included in an Nsmf message. In this way, the session management network element obtains the subscription permanent identifier of the second terminal device from the Nsmf message.

In some embodiments, the first terminal device is allowed to send a second key request to the key management network element, where the second key request includes an international mobile subscriber identity (international mobile subscriber identity, IMSI) of the second terminal device. After receiving the second key request, the key management network element performs an authorization check on the second terminal device based on the IMSI of the second terminal device. After the authorization check on the second terminal device succeeds, the key management network element obtains the secure communication parameter from the unified data management network element. After obtaining the secure communication parameter, the key management network element sends a second key response to the first terminal device, where the second key response includes the secure communication parameter.

Based on the network architecture shown in FIG. 1, the following further describes the method for obtaining an identifier of a terminal device shown in FIG. 2 by using an example in which the key management network element is a PKMF network element, the unified data management network element is a UDM network element, the session management network element is an SMF network element, the access and mobility management network element is an AMF network element, and the proximity service network element is a ProSe network element.

(1) The first identifier is a SUCI.

Figure 3B:
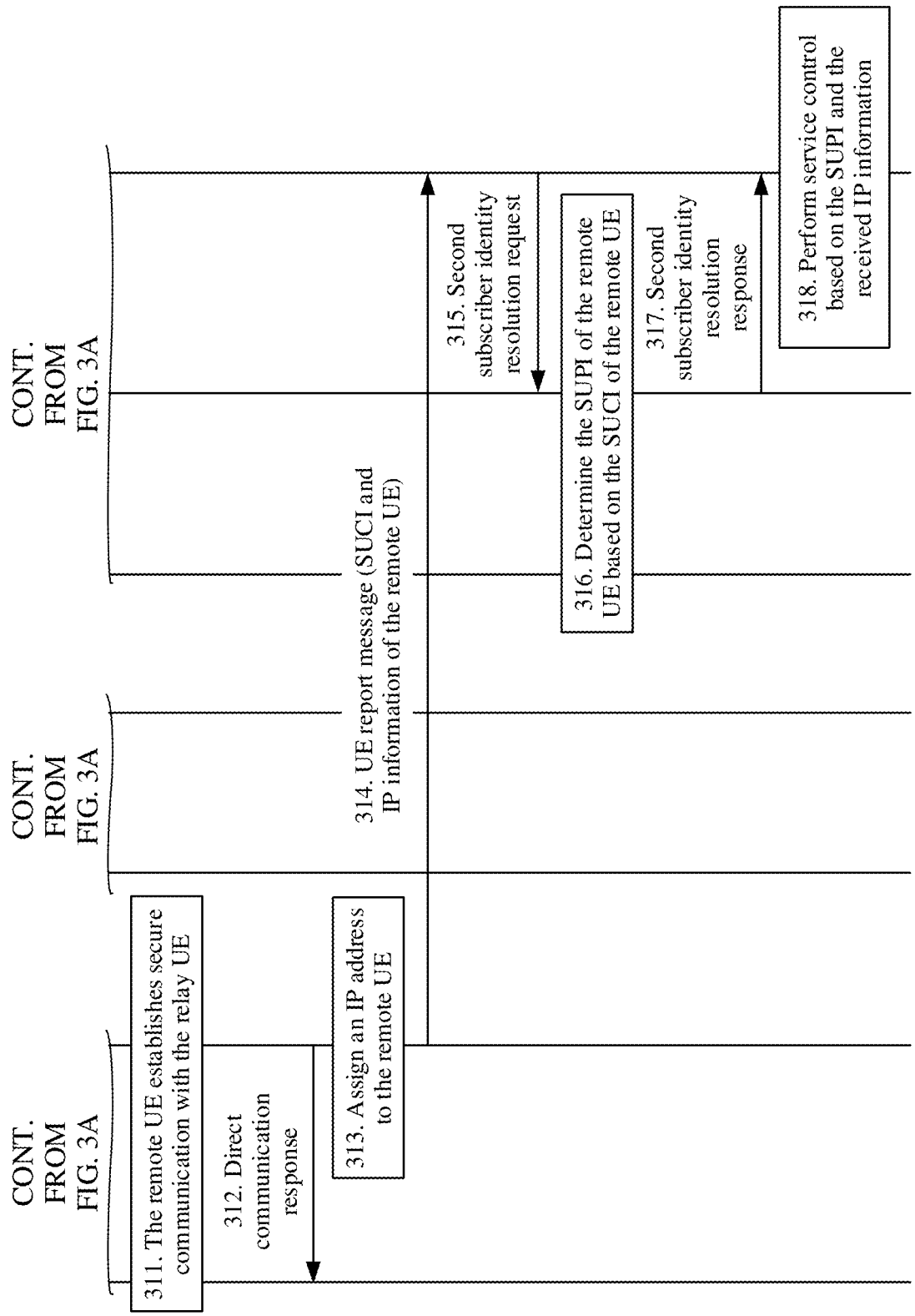

FIG. 3A and FIG. 3B show a method for obtaining an identifier of a terminal device according to some embodiments. The method includes the following steps:

Step 301. Relay UE initiates a registration procedure to the AMF network element via a RAN, so that UE registers to a 5G system.

Step 302. Remote UE initiates a discovery procedure for data exchange with a data network, to discover the relay UE, where in the discovery procedure, the remote UE detects proximity relay UE using radio signals, and identifies the relay UE.

Step 303. After discovering the relay UE, the remote UE sends a direct communication request to the relay UE, where the direct communication request requests to establish a communication connection to the relay UE, and the direct communication request includes a SUCI of the remote UE.

Step 304. After receiving the direct communication request, the relay UE sends a first key request to the PKMF network element, where the first key request includes the SUCI.

A function of the first key request is not limited in some embodiments. The first key request requests the PKMF network element to perform an authorization check on the remote UE, or requests to allocate a security key to the remote UE, or requests a secure communication parameter for establishing secure communication between the remote UE and the relay UE.

In some embodiments, the relay UE directly sends the first key request to the PKMF network element, or sends the first key request to the PKMF network element via another network element.

Step 305. After receiving the first key request, and determining that the first key request includes the SUCI, the PKMF network element selects the UDM network element based on the SUCI, and sends, to the UDM network element, a first subscriber identity resolution request including the SUCI, to request the UDM network element to resolve the SUCI.

Step 306. After receiving the first subscriber identity resolution request, the UDM network element obtains the SUCI in the first subscriber identity resolution request. The UDM network element determines a SUPI of the remote UE based on the SUCI of the remote UE.

A manner in which the UDM network element determines the SUPI of the remote UE based on the SUCI of the remote UE is not limited in some embodiments. For example, the UDM network element capable of decryption directly decrypts the SUCI of the remote UE to obtain the SUPI of the remote UE. In another example, the UDM network element invokes another network element (such as a SIDF network element), to obtain the SUPI of the remote UE from the another network element.

Optionally, the UDM network element further stores a correspondence between the SUCI and the SUPI of the remote UE. A location for storing the correspondence by the UDM network element is not limited in some embodiments. For example, the UDM network element locally stores the correspondence, or stores the correspondence in another network element (for example, a UDR network element). When the SUCI or the SUPI of the remote UE is to be subsequently determined, the stored correspondence between the SUCI and the SUPI of the remote UE is obtained from another network element.

In some embodiments, the UDM network element actively stores the correspondence between the SUCI and the SUPI of the remote UE. For example, after determining the SUPI of the remote UE based on the SUCI of the remote UE, the UDM network element directly stores the correspondence, or first determines, based on an attribute of the remote UE, whether to store the correspondence. The UDM network element queries for subscription information of the remote UE based on the SUPI of the remote UE, and store the correspondence after determining that the remote UE is a commercial subscriber.

Alternatively, the UDM network element stores the correspondence between the SUCI and the SUPI of the remote UE under indication of the PKMF network element. The PKMF network element sends, to the UDM network element, a first indication indicating to store the correspondence between the SUCI and the SUPI of the remote UE. After receiving the first indication, the UDM network element stores the correspondence between the SUCI and the SUPI of the remote UE. The first indication message is separately sent, or is included in a message (for example, the first subscriber identity resolution request) sent by the PKMF network element to the UDM network element.

Step 307. After determining the SUPI of the remote UE, the UDM network element feeds back a first subscriber identity resolution response to the PKMF network element, where the first subscriber identity resolution response includes the SUPI of the remote UE.

Optionally, after determining the SUPI of the remote UE, the UDM network element further determines a GPSI of the remote UE based on the SUPI of the remote UE, and include the GPSI of the remote UE in the first subscriber identity resolution response.

Step 308. After receiving the first subscriber identity resolution response, the PKMF network element obtains the SUPI of the remote UE from the first subscriber identity resolution response. The PKMF network element performs the authorization check on the remote UE based on the SUPI of the remote UE, to determine whether the remote UE is authorized to connect to a network for data exchange with a DN via the selected relay UE.

The PKMF network element pre-stores a SUPI set including one or more SUPIs. Terminal devices corresponding to the SUPIs in the set connects to the network via the relay UE. The PKMF network element determines whether the SUPI of the remote UE belongs to the SUPI set. If the SUPI of the remote UE belongs to the SUPI set, the authorization check performed by the PKMF network element on the remote UE succeeds, and the remote UE performs data exchange with the 5G system via the relay UE. Otherwise, the authorization check performed by the PKMF network element fails.

Optionally, the first subscriber identity resolution response further includes the GPSI of the remote UE.

Step 309. After the authorization check performed by the PKMF network element on the remote UE succeeds, the PKMF network element obtains a secure communication parameter from the UDM network element, where the secure communication parameter is the parameter for establishing secure communication between the relay UE and the remote UE. The secure communication parameter includes key-related information for generating a security key.

Optionally, the PKMF network element alternatively obtains the secure communication parameter via another network element such as a BSF network element.

If the authorization check performed by the PKMF network element on the remote UE fails, the PKMF network element sends authorization failure indication information to the relay UE, so that the relay UE terminates or refuses to serve the remote UE. The PKMF network element further notifies the UDM network element to delete the stored correspondence between the SUCI and the SUPI of the remote UE. After receiving the notification, the UDM network element deletes the correspondence if the UDM network element has already stored the correspondence between the SUCI and the SUPI of the remote UE. Otherwise, the UDM network element ignores the notification.

Step 310. After obtaining the secure communication parameter, the PKMF network element sends a first key response to the relay UE, where the first key response includes the secure communication parameter.

Optionally, the first key response further includes the SUCI of the remote UE. The SUCI of the remote UE included in the first key response is used by the relay UE to provide the information for a core network element such as the SMF network element or the AMF network element.

In some embodiments, when the first key request requests the PKMF network element to perform the authorization check on the remote UE, the first key response is unable to include the secure communication parameter. In other words, the PKMF network element does not a call to perform step 309. After the authorization check performed on the remote UE succeeds, the PKMF network element directly sends the first key response, to indicate that the authorization check performed on the remote UE succeeds. When the first key request requests to obtain the secure communication parameter, the first key response includes the secure communication parameter including the key-related information.

In some embodiments, if the first subscriber identity resolution response includes the GPSI of the remote UE, the first key response is unable to include the SUCI, but includes the GPSI of the remote UE.

Step 311. After receiving the first key response, the relay UE establishes secure communication with the remote UE based on the secure communication parameter.

Step 312. The relay UE sends a direct communication response to the remote UE in response to the direct communication request.

Step 313. The relay UE assigns, to the remote UE, an IP address for communication.

That is, the IP address is an IPv6 prefix or an IPv4 address.

Step 314. The relay UE is to send a UE report message to the SMF network element, where the UE report message includes the SUCI and IP information of the remote UE. If the IP address in step 313 is the IPv6 prefix, the IP information is the IPv6 prefix assigned by the relay UE to the remote UE. If the IP address in step 313 is the IPv4 address, the IP information is a port number range assigned by the relay UE to the remote UE.

The SUCI of the remote UE included in the UE report message for the relay UE is obtained from the first key response, or is obtained from the direct communication request.

Step 315. After receiving the UE report message, and determining that the UE report message includes the SUCI, the SMF network element sends a second subscriber identity resolution request including the SUCI to the UDM network element, to request the UDM network element to resolve the SUCI.

Step 316. After receiving the second subscriber identity resolution request, the UDM network element obtains the SUCI in the second subscriber identity resolution request. The UDM network element determines the SUPI of the remote UE based on the SUCI of the remote UE.

A manner in which the UDM network element determines the SUPI of the remote UE based on the SUCI of the remote UE is similar to the manner in which the UDM network element determines the SUPI of the remote UE based on the SUCI of the remote UE in step 306. For details, refer to the foregoing content. Details are not described herein again.

In some embodiments, if the UDM network element stores the correspondence between the SUCI and the SUPI of the remote UE, when determining the SUPI of the remote UE based on the SUCI of the remote UE, the UDM network element directly determines the SUPI of the remote UE based on the correspondence and the SUCI of the remote UE.

Optionally, in a case that the UDM network element stores the correspondence between the SUCI and the SUPI of the remote UE, the UDM network element deletes the correspondence after the UDM network element determines the SUPI of the remote UE based on the SUCI of the remote UE.

Step 317. After determining the SUPI of the remote UE, the UDM network element feeds back a second subscriber identity resolution response to the SMF network element, where the second subscriber identity resolution response includes the SUPI of the remote UE.

Step 318. After receiving the second subscriber identity resolution response, the SMF network element obtains the SUPI of the remote UE from the second subscriber identity resolution response. Further, the SMF network element performs service control based on the SUPI and the received IP information, such as lawful interception and traffic statistics. This is not limited herein.

In some embodiments, if the first key response in step 310 includes the GPSI of the remote UE, the SUCI of the remote UE in step 314 to step 316 is replaced with the GPSI of the remote UE.

Figure 4A:
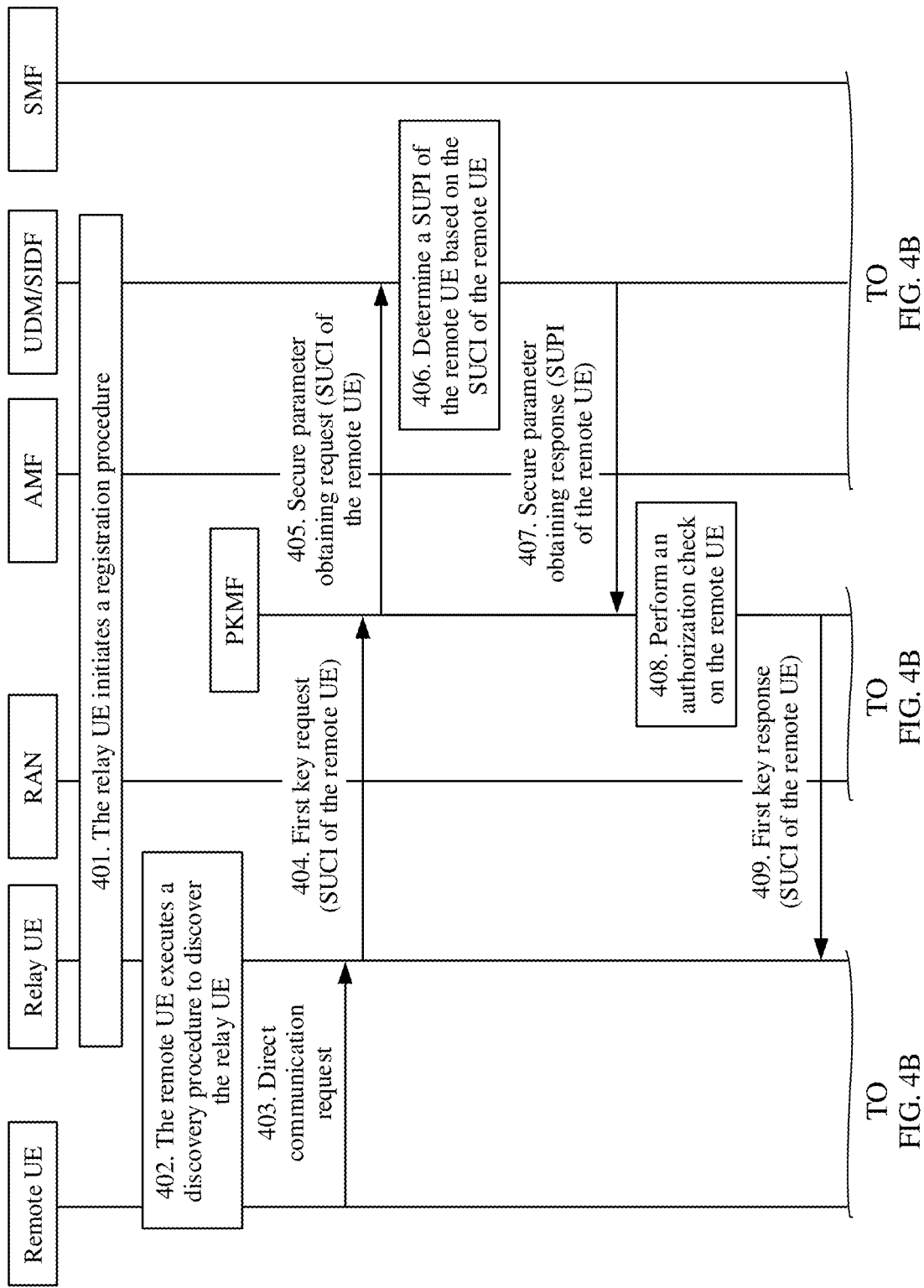
FIG. 4A and FIG. 4B are a schematic diagram of a second method for obtaining an identifier of a terminal device according to some embodiments.
Figure 4B:
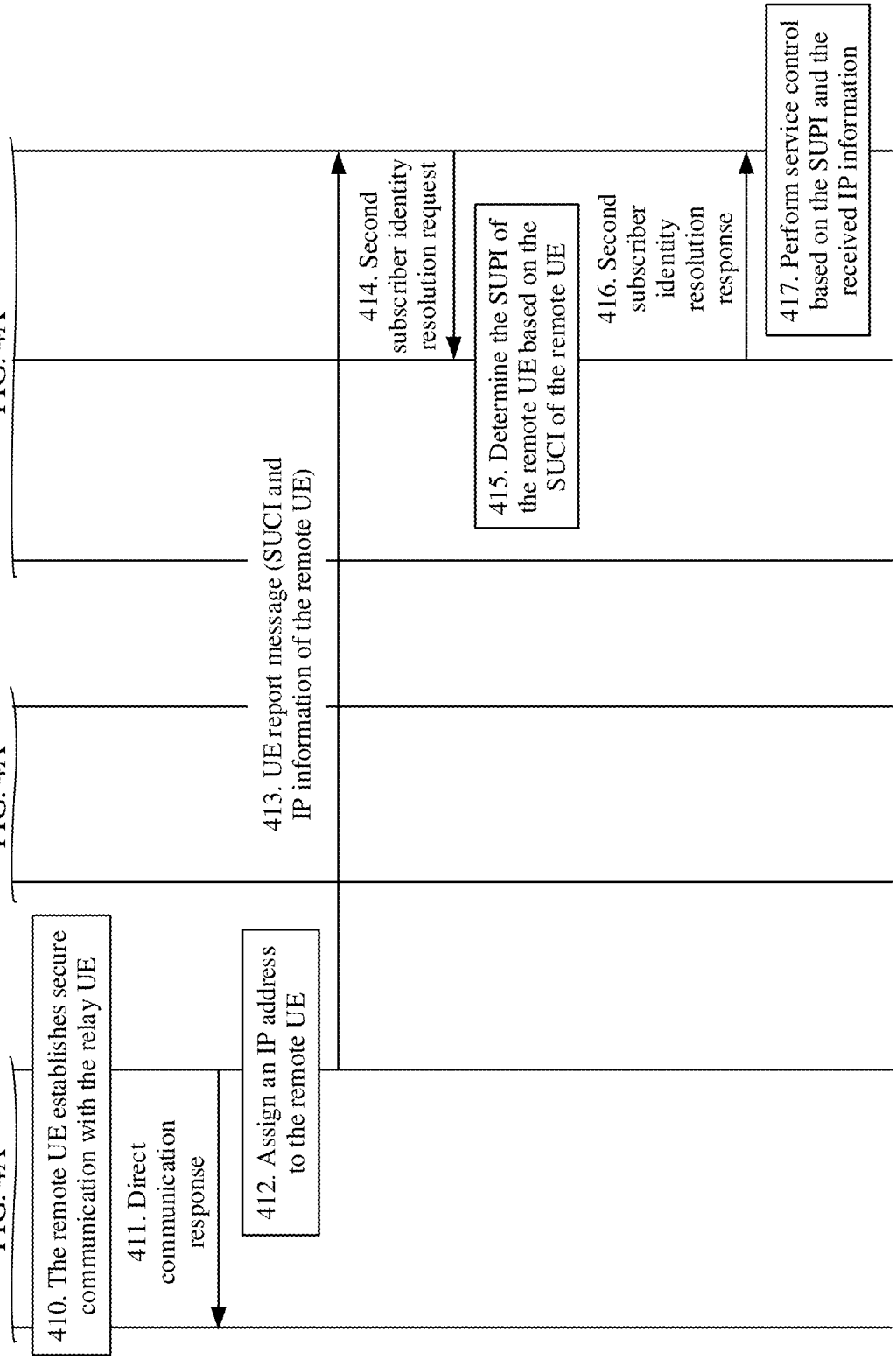

In some embodiments, such as shown in FIG. 3A and FIG. 3B, the PKMF network element first requests to obtain the SUPI of the remote UE from the UDM network element, and then requests the secure communication parameter from the UDM network element or another network element. To further reduce signaling interaction between the PKMF network element and the UDM network element, the PKMF network element requests the secure communication parameter while requesting to obtain the SUPI of the remote UE from the UDM network element. For details, refer to the embodiment shown in FIG. 4A and FIG. 4B. FIG. 4A and FIG. 4B show a method for obtaining an identifier of a terminal device according to some embodiments. The method includes the following steps:

Step 401 to step 404 are the same as step 301 to step 304. For details, refer to the foregoing content. Details are not described herein again.

Step 405. After receiving the first key request, and determining that the first key request includes the SUCI, the PKMF network element selects the UDM network element based on the SUCI, and sends, to the UDM network element, a secure communication parameter obtaining request including the SUCI, where the secure communication parameter obtaining request requests to obtain a secure communication parameter, and the secure communication parameter obtaining request includes the SUCI and requests the UDM network element to resolve the SUCI.

Step 406. After receiving the secure communication parameter obtaining request, the UDM network element determines the secure communication parameter, obtains the SUCI from the secure communication parameter obtaining request, and determines a SUPI of the remote UE based on the SUCI of the remote UE.

For a manner in which the UDM network element determines the SUPI of the remote UE based on the SUCI of the remote UE and stores a correspondence between the SUCI and the SUPI of the remote UE, refer to related descriptions in step 306. Details are not described herein again.

Step 407. After determining the SUPI of the remote UE, the UDM network element feeds back a secure communication parameter obtaining response to the PKMF network element, where the secure communication parameter obtaining response includes the SUPI of the remote UE and the secure communication parameter.

Optionally, after determining the SUPI of the remote UE, the UDM network element further determines a GPSI of the remote UE based on the SUPI of the remote UE, and include the GPSI of the remote UE in the secure communication parameter obtaining response.

Step 408. After receiving the secure communication parameter obtaining response, the PKMF network element obtains the SUPI of the remote UE from the secure communication parameter obtaining response. The PKMF network element performs the authorization check on the remote UE based on the SUPI of the remote UE, to determine whether the remote UE is authorized to connect to a network for data exchange with a DN via the selected relay UE.

Step 409. After obtaining the secure communication parameter, the PKMF network element sends a first key response to the relay UE, where the first key response includes the secure communication parameter.

Step 410. After performing the authorization check on the remote UE succeeds, the PKMF network element establishes secure communication with the remote UE based on the secure communication parameter.

Step 411 to step 417 are the same as step 312 to step 318. For details, refer to the foregoing content. Details are not described herein again.

In some embodiments, such as shown in FIG. 3A and FIG. 3B or FIG. 4A and FIG. 4B, after the authorization check performed by the PKMF network element on the remote UE succeeds, the first key response sent by the PKMF network element to the relay UE includes the SUCI of the remote UE, and the PKMF network element directly notifies the relay UE of the SUPI of the remote UE. For details, refer to the following embodiment.

Figure 5A:
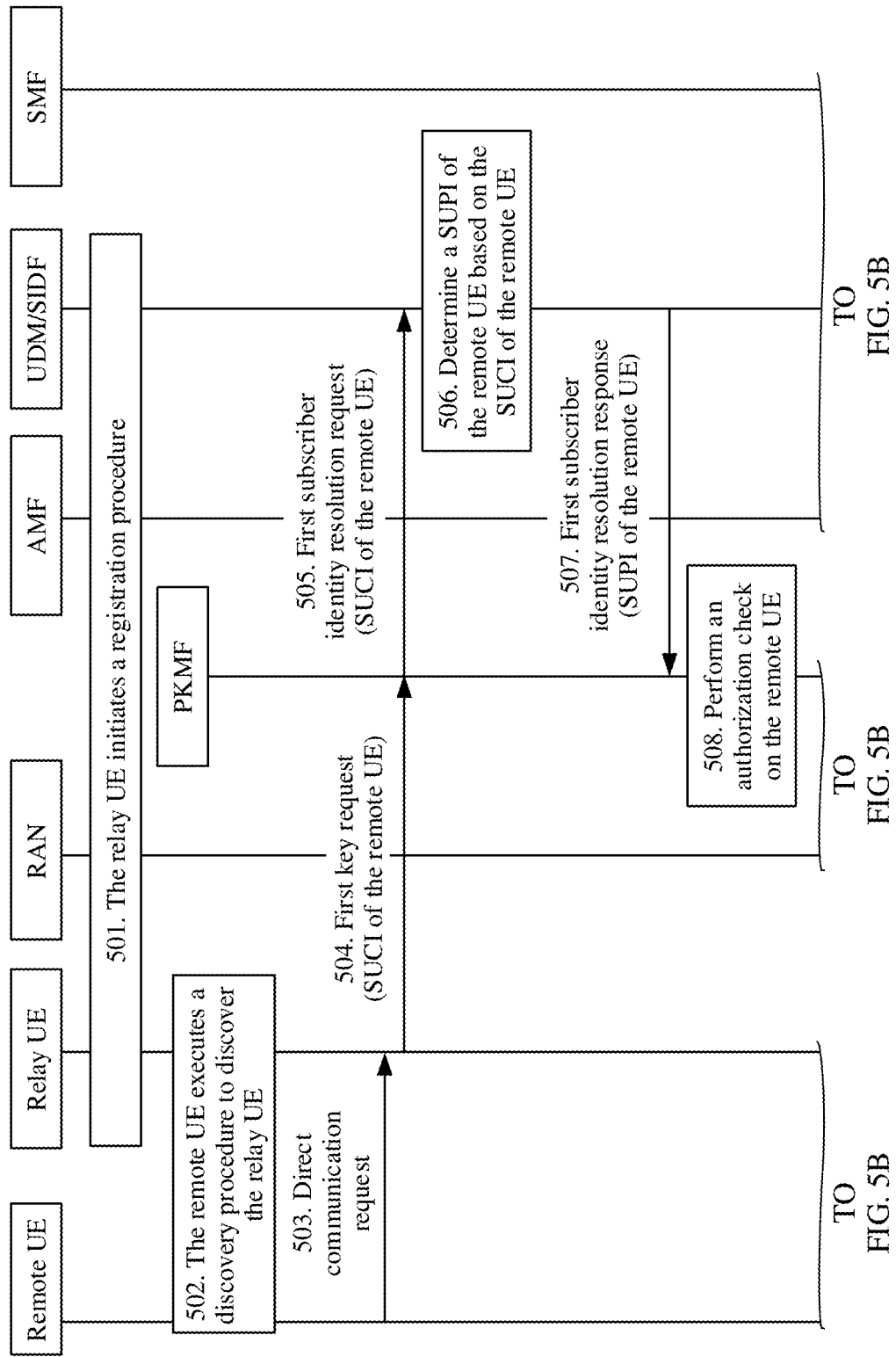
FIG. 5A and FIG. 5B are a schematic diagram of a third method for obtaining an identifier of a terminal device according to some embodiments.
Figure 5B:
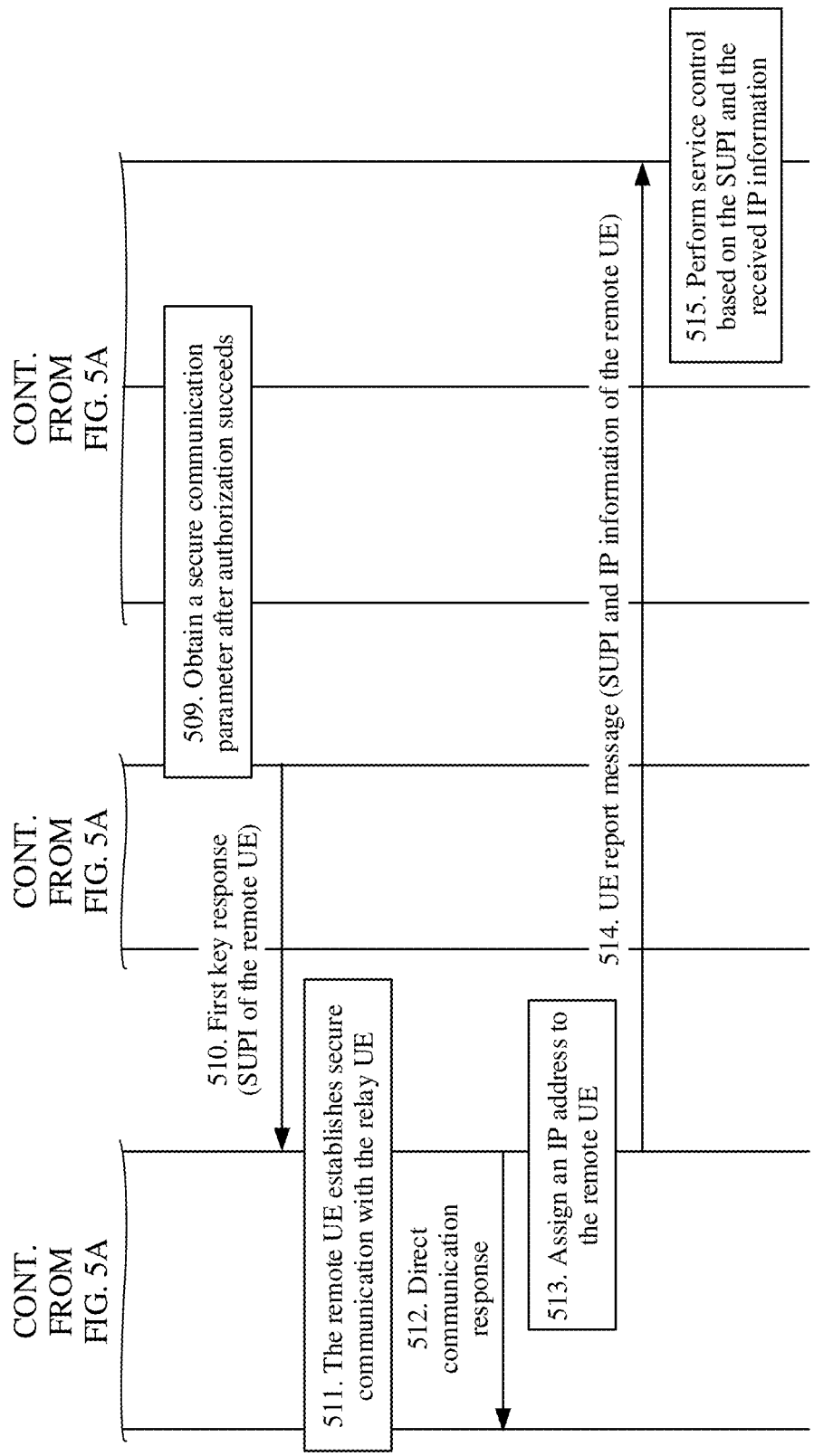

FIG. 5A and FIG. 5B show a method for obtaining an identifier of a terminal device according to some embodiments. The method includes the following steps:

Step 501 to step 509 are the same as step 301 to step 309. For details, refer to the foregoing content. Details are not described herein again.

Step 510. After obtaining the secure communication parameter, the PKMF network element sends a first key response to the relay UE, where the first key response includes the secure communication parameter.

Optionally, the first key response further includes the SUPI of the remote UE.

Step 511 to step 513 are the same as step 311 to step 313. For details, refer to the foregoing content. Details are not described herein again.

Step 514. The relay UE is to send a UE report message to the SMF network element, where the UE report message includes the SUPI and IP information of the remote UE. If the IP address in step 513 is an IPv6 prefix, the IP information is the IPv6 prefix assigned by the relay UE to the remote UE. If the IP address in step 513 is an IPv4 address, the IP information is a port number range assigned by the relay UE to the remote UE. The IPv4 address corresponds to the port number range.

The SUCI of the remote UE included in the UE report message for the relay UE is obtained from the first key response, or is obtained from the direct communication request.

Step 515. The SMF network element obtains the SUPI of the remote UE from the UE report message. Further, the SMF network element performs service control based on the SUPI and the received IP information, such as lawful interception and traffic statistics. This is not limited herein.

In some embodiments, such as those shown in FIG. 5A and FIG. 5B, the PKMF network element directly sends a secure parameter obtaining request including the SUCI to the UDM network element. The UDM network element determines the SUPI of the remote UE based on the SUCI, and determines the secure communication parameter. Subsequently, the UDM network element sends a secure parameter obtaining response to the PKMF network element, where the secure parameter obtaining response includes the remote SUPI and the secure communication parameter.

In this embodiment, the SMF network element determines the SUPI of the remote UE with no call to interact with the UDM network element, so that signaling interaction is further reduced.

(2) The first identifier is a temporary identifier of the remote UE.

Figure 6A:
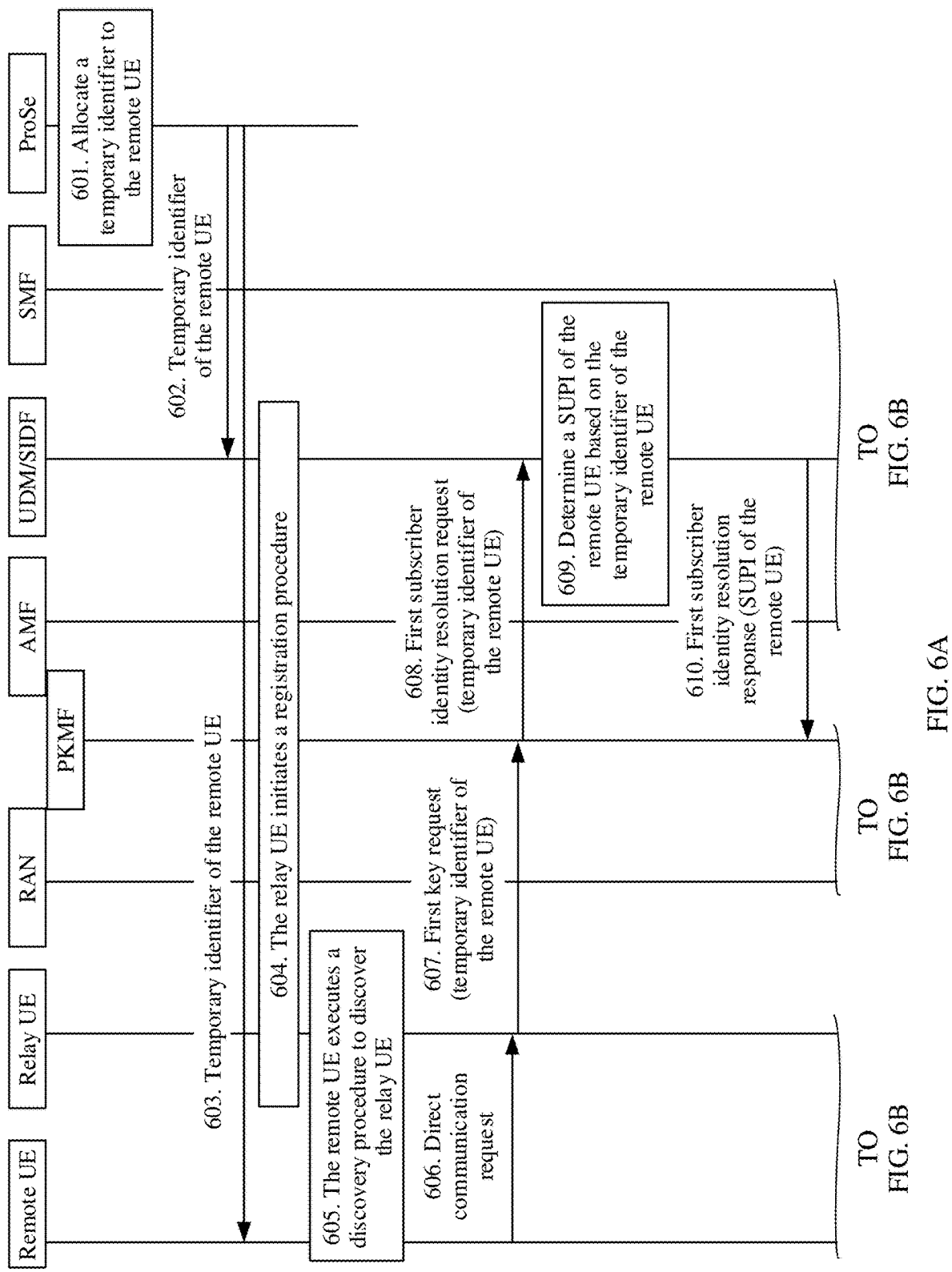

FIG. 6A to FIG. 6C show a method for obtaining an identifier of a terminal device according to some embodiments. The method includes the following steps:

Step 601. A ProSe network element allocates a temporary identifier to remote UE.

Step 602. The ProSe network element sends, to a UDM network element, the temporary identifier allocated to the remote UE.

After receiving the temporary identifier of the remote UE, the UDM network element locally stores a correspondence between the temporary identifier and a SUPI of the remote UE.

Step 603. The ProSe network element sends the temporary identifier of the remote UE to the remote UE.

Step 604. Relay UE initiates a registration procedure to an AMF network element via a RAN, so that UE registers to a 5G system.

Step 605. The remote UE initiates a discovery procedure for data exchange with a data network, to discover the relay UE.

Step 606. After discovering the relay UE, the remote UE sends a direct communication request to the relay UE, where the direct communication request requests to establish a communication connection to the relay UE, and the direct communication request includes the temporary identifier of the remote UE.

Step 607. After receiving the direct communication request, the relay UE sends a first key request to a PKMF network element, where the first key request includes the temporary identifier.

The relay UE directly sends the first key request to the PKMF network element, or sends the first key request to the PKMF network element via another network element.

For descriptions of the first key request, refer to related descriptions in some embodiments, such as shown in FIG. 3A and FIG. 3B. Details are not described herein again.

Step 608. After receiving the first key request, and determining that the first key request includes the temporary identifier, the PKMF network element selects the UDM network element based on the temporary identifier, and sends, to the UDM network element, a first subscriber identity resolution request including the temporary identifier, to request the UDM network element to resolve the temporary identifier.

Step 609. After receiving the first subscriber identity resolution request, the UDM network element obtains the temporary identifier in the first subscriber identity resolution request. The UDM network element determines the SUPI of the remote UE based on the temporary identifier of the remote UE.

The UDM network element determines the SUPI of the remote UE based on the stored correspondence between the temporary identifier and the SUPI of the remote UE.

Step 610. After determining the SUPI of the remote UE, the UDM network element feeds back a first subscriber identity resolution response to the PKMF network element, where the first subscriber identity resolution response includes the SUPI of the remote UE.

Step 611 to step 612 are the same as step 308 to step 309. For details, refer to the foregoing content. Details are not described herein again.

Step 613. After obtaining the secure communication parameter, the PKMF network element sends a first key response to the relay UE, where the first key response includes the secure communication parameter.

Optionally, the first key response further includes the temporary identifier of the remote UE. The temporary identifier of the remote UE included in the key response is used by the relay UE to provide the information for a core network element such as an SMF network element or an AMF network element.

Step 614 to step 616 are the same as step 311 to step 313. For details, refer to the foregoing content. Details are not described herein again.

Step 617. The relay UE is to send a UE report message to the SMF network element, where the UE report message includes the temporary identifier and IP information of the remote UE. If the IP address in step 616 is an IPv6 prefix, the IP information is the IPv6 prefix assigned by the relay UE to the remote UE. If the IP address in step 616 is an IPv4 address, the IP information is a port number range assigned by the relay UE to the remote UE.

The temporary identifier of the remote UE included in the UE report message for the relay UE is obtained from the first key response, or is obtained from the direct communication request.

Step 618. After receiving the UE report message, and determining that the UE report message includes the temporary identifier, the SMF network element sends a second subscriber identity resolution request including the temporary identifier to the UDM network element, to request the UDM network element to resolve the temporary identifier.

Step 619. After receiving the second subscriber identity resolution request, the UDM network element obtains the temporary identifier in the second subscriber identity resolution request. The UDM network element determines the SUPI of the remote UE based on the temporary identifier of the remote UE.

A manner in which the UDM network element determines the SUPI of the remote UE based on the temporary identifier of the remote UE is similar to the manner in which the UDM network element determines the SUPI of the remote UE based on the temporary identifier of the remote UE in step 606. For details, refer to the foregoing content. Details are not described herein again.

Step 620. After determining the SUPI of the remote UE, the UDM network element feeds back a second subscriber identity resolution response to the SMF network element, where the second subscriber identity resolution response includes the SUPI of the remote UE.

Step 621. After receiving the second subscriber identity resolution response, the SMF network element obtains the SUPI of the remote UE from the second subscriber identity resolution response. Further, the SMF network element performs service control based on the SUPI and the received IP information, such as lawful interception and traffic statistics. This is not limited herein.

In some embodiments, such as those shown in FIG. 6A to FIG. 6C, the PKMF network element directly sends a secure parameter obtaining request including the temporary identifier of the remote UE to the UDM network element. The UDM network element determines the SUPI of the remote UE based on the temporary identifier, and determines the secure communication parameter. Subsequently, the UDM network element sends a secure parameter obtaining response to the PKMF network element, where the secure parameter obtaining response includes the remote SUPI and the secure communication parameter.

In some embodiments, such as shown in FIG. 6A to FIG. 6C, the SMF network element is to interact with the UDM network element to obtain the SUPI of the remote UE. In some embodiments, the AMF network element also interacts with the UDM network element to obtain the SUPI of the remote UE. The remote UE sends an N1 message to the AMF network element. The N1 message includes the temporary identifier of the remote UE and an N1 SM message, and the NI SM message includes the IP information. After receiving the temporary identifier of the remote UE, the AMF network element initiates an identifier resolution procedure, and send, to the UDM network element, an identifier resolution request including the temporary identifier of the remote UE. After receiving the identifier resolution request, the UDM network element determines the SUPI of the remote UE based on the temporary identifier of the remote UE. Subsequently, the UDM network element sends an identifier resolution response including the SUPI of the remote UE to the AMF network element. The AMF network element sends an Nsmf message to the SMF network element, where the Nsmf message includes the SUPI of the remote UE and the N1 SM message. The SMF network element obtains the SUPI of the remote UE from the Nsmf message.

In some embodiments, such as shown in FIG. 6A to FIG. 6C, after an authorization check performed by the PKMF network element on the remote UE succeeds, the first key response sent by the PKMF network element to the relay UE includes the temporary identifier of the remote UE. Alternatively, the PKMF network element directly notifies the relay UE of the SUPI of the remote UE. For details, refer to the following embodiment.

Figure 7A:
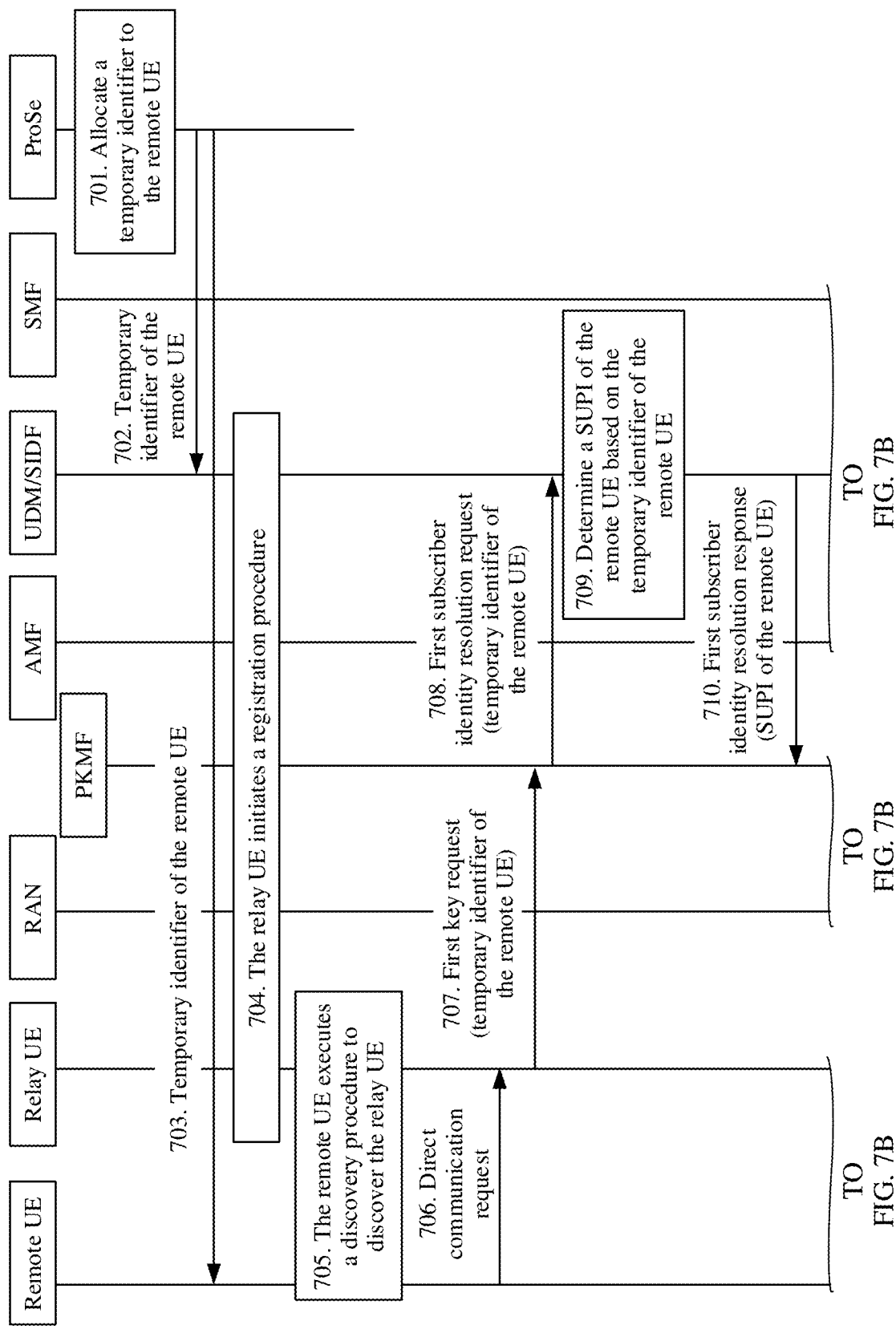
FIG. 7A and FIG. 7B are a schematic diagram of a fifth method for obtaining an identifier of a terminal device according to some embodiments.
Figure 7B:
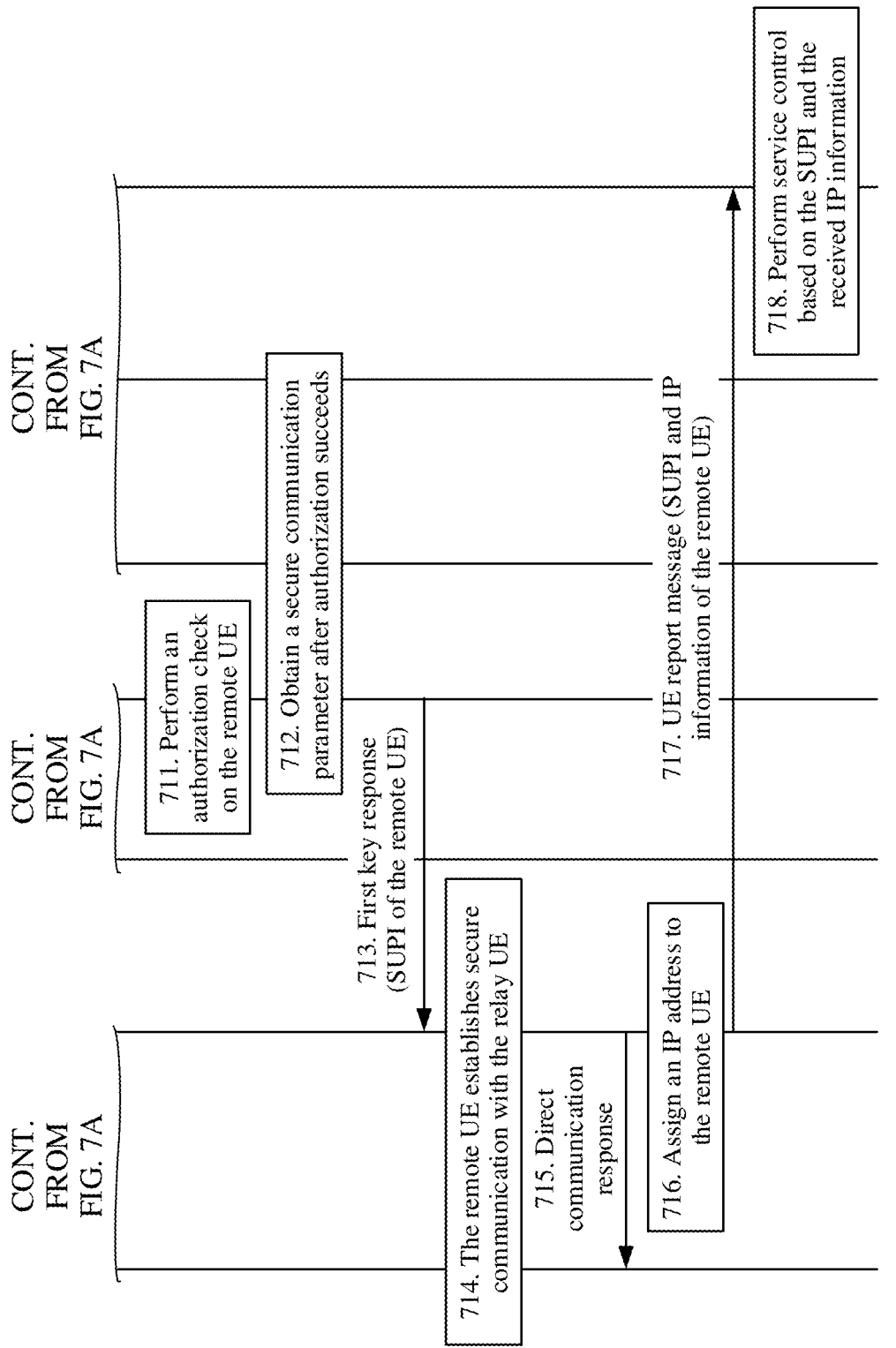

FIG. 7A and FIG. 7B show a method for obtaining an identifier of a terminal device according to some embodiments. The method includes the following steps:

Step 701 to step 712 are the same as step 601 to step 612. For details, refer to the foregoing content. Details are not described herein again.

Step 713 to step 718 are the same as step 510 to step 515. For details, refer to the foregoing content. Details are not described herein again.

In some embodiments, such as those shown in FIG. 7A and FIG. 7B, the PKMF network element directly sends a secure parameter obtaining request including the temporary identifier of the remote UE to the UDM network element. The UDM network element determines the SUPI of the remote UE based on the temporary identifier, and determines the secure communication parameter. Subsequently, the UDM network element sends a secure parameter obtaining response to the PKMF network element, where the secure parameter obtaining response includes the remote SUPI and the secure communication parameter. In other words, the PKMF network element requests the secure communication parameter while requesting to obtain the SUPI of the remote UE from the UDM network element, so that signaling interaction is reduced.

In some embodiments, the relay UE first obtains the secure communication parameter, establish secure communication with the remote UE, and then request, via the SMF network element or the AMF network element, the UDM network element to resolve the SUCI.

Figure 8A:
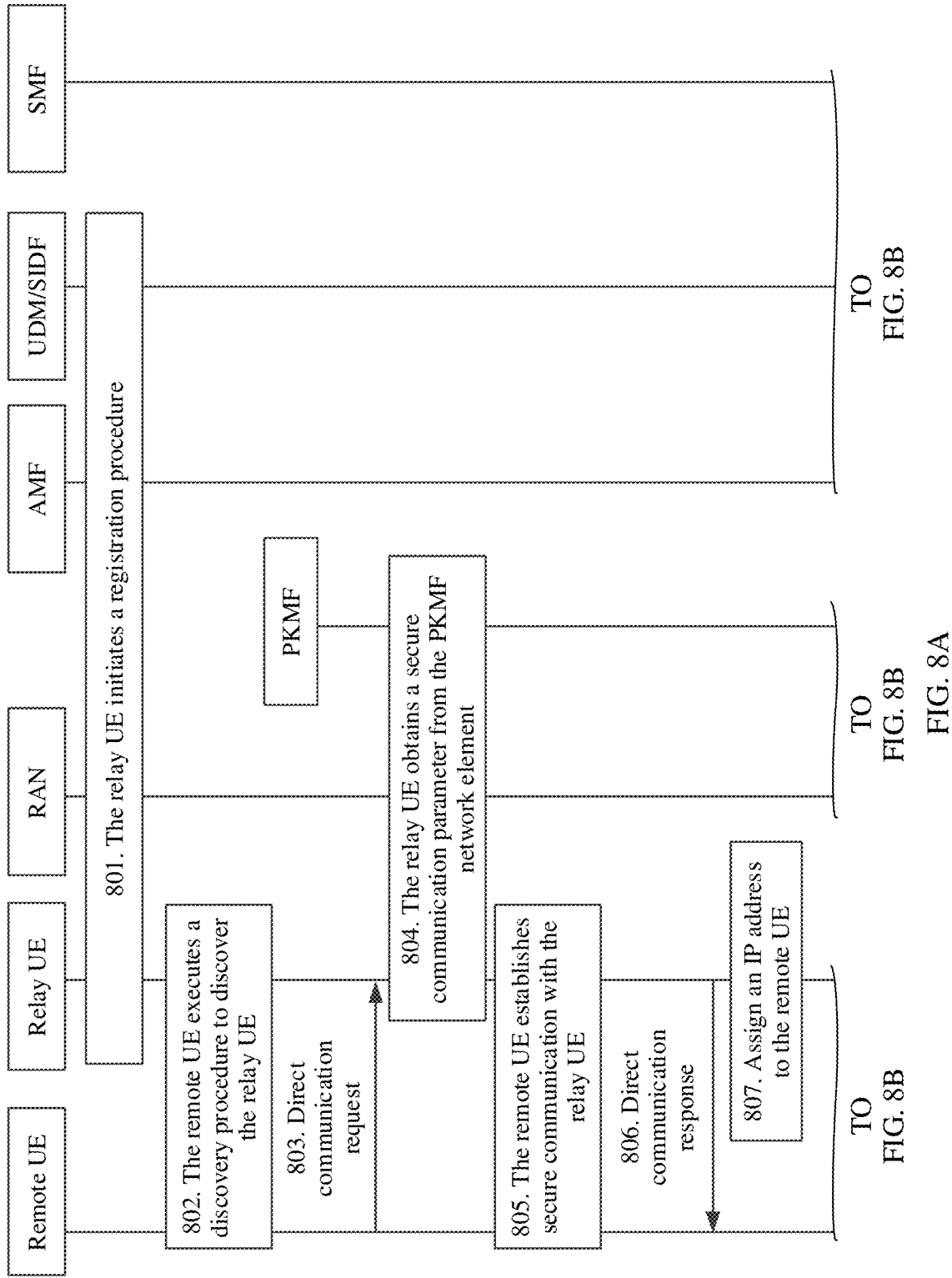
FIG. 8A and FIG. 8B are a schematic diagram of a sixth method for obtaining an identifier of a terminal device according to some embodiments.
Figure 8B:
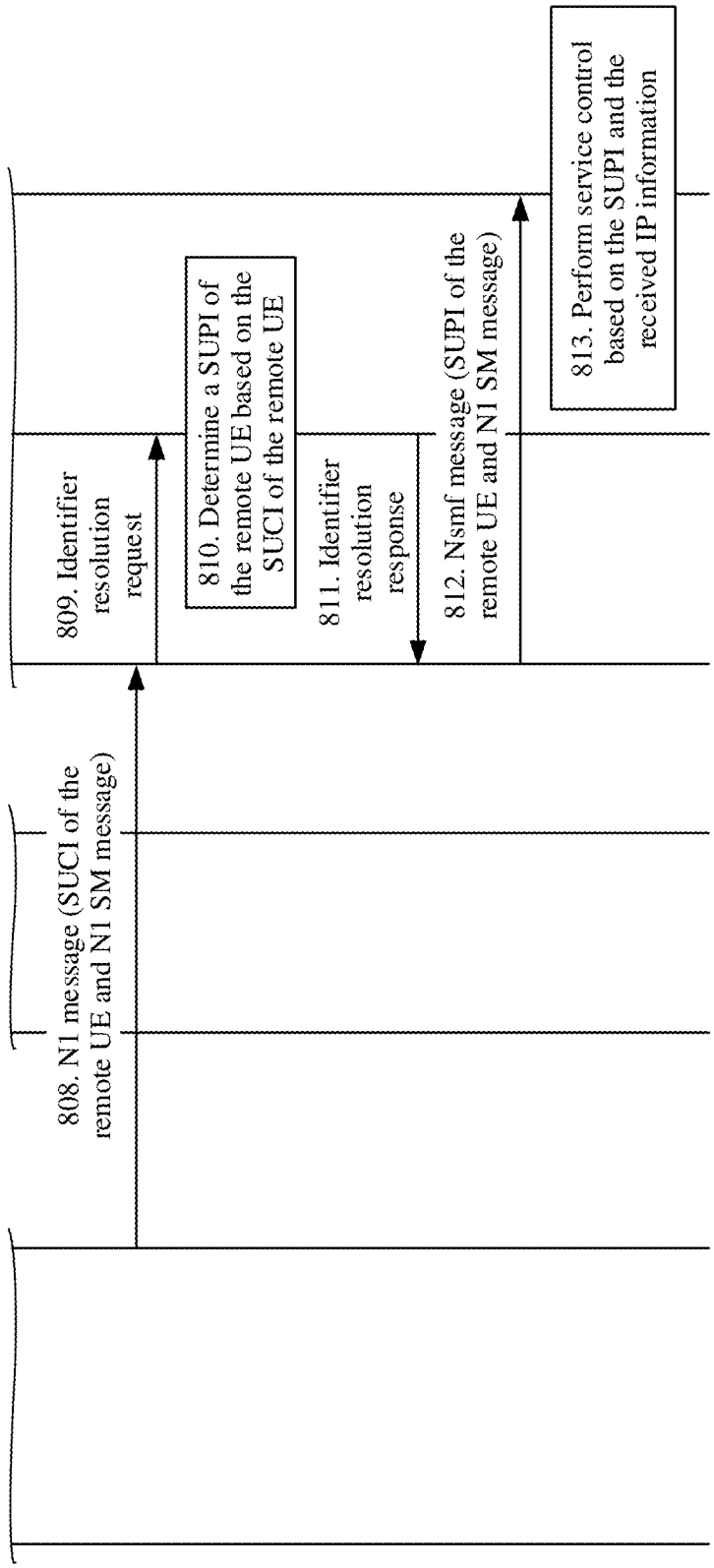

Refer to FIG. 8A and FIG. 8B. An example in which relay UE requests, via the AMF network element, the UDM network element to resolve the SUCI is used for description. The method includes the following steps:

Step 801 to step 803 are the same as step 301 to step 303. For details, refer to the foregoing content. Details are not described herein again.

Step 804. After receiving the direct communication request, the relay UE obtains a secure communication parameter from the PKMF network element.

That is, the direct communication request includes a key identifier. The key identifier is an identifier of a security key used for encryption and/or integrity protecting data exchanged between the remote UE and the relay UE. The relay UE obtains a corresponding secure communication parameter from the PKMF network element based on the key identifier.

Step 805. The relay UE establishes secure communication with the remote UE based on the secure communication parameter.

Step 806. The relay UE sends a direct communication response to the remote UE in response to the direct communication request.

Step 807. The relay UE assigns, to the remote UE, an IP address for communication.

That is, the IP address is an IPv6 prefix or an IPv4 address.

Step 808. The relay UE is to send an N1 message to the AMF network element, where the N1 message includes the SUCI of the remote UE and an N1 SM message, and the N1 SM message includes IP information.

If the IP address in step 807 is the IPv6 prefix, the IP information is the IPv6 prefix assigned by the relay UE to the remote UE. If the IP address in step 808 is the IPv4 address, the IP information is a port number range assigned by the relay UE to the remote UE.

Step 809. After receiving a UE report message, and determining that the UE report message includes the SUCI, the AMF network element sends an identifier resolution request including the SUCI to the UDM network element, to request the UDM network element to resolve the SUCI.

Step 810. After receiving the identifier resolution request, the UDM network element obtains the SUCI in the identifier resolution request. The UDM network element determines a SUPI of the remote UE based on the SUCI of the remote UE.

A manner in which the UDM network element determines the SUPI of the remote UE based on the SUCI of the remote UE is similar to the manner in which the UDM network element determines the SUPI of the remote UE based on the SUCI of the remote UE in step 306. For details, refer to the foregoing content. Details are not described herein again.

Step 811. After determining the SUPI of the remote UE, the UDM network element feeds back an identifier resolution response to the AMF network element, where the identifier resolution response includes the SUPI of the remote UE.

Step 812. After receiving the identifier resolution response, the AMF network element obtains the SUPI of the remote UE from the identifier resolution response. The AMF network element sends an Nsmf message to the SMF network element, where the Nsmf message includes the SUPI of the remote UE and the N1 SM message.

Step 813. The SMF network element performs service control based on the SUPI and the received IP information, such as lawful interception and traffic statistics. This is not limited herein.

In some embodiments, the relay UE alternatively requests, via the SMF network element, the UDM network element to resolve the SUCI. That is, the relay UE sends the UE report message to the SMF network element via the AMF network element. After receiving the UE report message, the SMF network element requests the UDM network element to resolve the SUCI. For a process, refer to related descriptions of step 315 to step 318 in some embodiments, such as shown in FIG. 3B.

Figure 9:
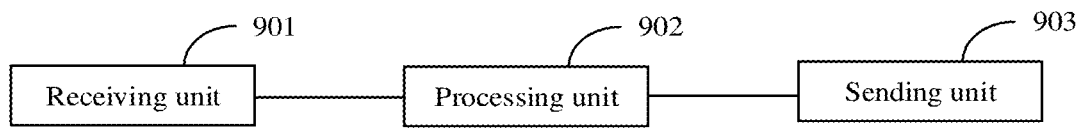
FIG. 9 to FIG. 15 are schematic diagrams of structures of communication apparatuses according to some embodiments.

Based on a same inventive concept as the method embodiments, some embodiments further provides a communication apparatus, configured to perform the method performed by the key management network element or the PKMF network element in the foregoing method embodiments. For related features, refer to the foregoing method embodiments. Details are not described herein again. As shown in FIG. 9, the apparatus includes a receiving unit 901, a processing unit 902, and a sending unit 903.

The receiving unit 901 is configured to receive a first key request from a first terminal device, where the first key request includes a first identifier, and the first identifier is an anonymous identifier or a temporary identifier of a second terminal device.

The processing unit 902 is configured to determine that the first key request includes the first identifier.

The sending unit 903 is configured to: after the processing unit 902 determines that the first key request includes the first identifier, send a first request to a unified data management network element, where the first request includes the first identifier.

The receiving unit 901 is further configured to receive a first response from the unified data management network element, where the first response includes a subscription permanent identifier SUPI of the second terminal device.

The processing unit 902 is further configured to perform an authorization check on the second terminal device based on the SUPI of the second terminal device.

The sending unit 903 is further configured to: after the authorization check performed by the processing unit 902 on the second terminal device succeeds, send a first key response to the first terminal device, where the first key response includes a secure communication parameter, and the secure communication parameter is a parameter for establishing secure communication between the first terminal device and the second terminal device.

In some embodiments, the first response and the first key response further include a GPSI of the second terminal device or the first identifier.

In some embodiments, the first request is a secure communication parameter obtaining request, and the first response is a secure communication parameter obtaining response.

In some embodiments, after the authorization check performed by the processing unit 902 on the second terminal device based on the second identifier fails, the sending unit 903 notifies the unified data management network element to delete a correspondence between the first identifier and the SUPI of the second terminal device.

In some embodiments, the sending unit 903 further sends a first indication to the unified data management network element, where the first indication indicates to store the correspondence between the first identifier and the SUPI of the second terminal device.

Figure 10:
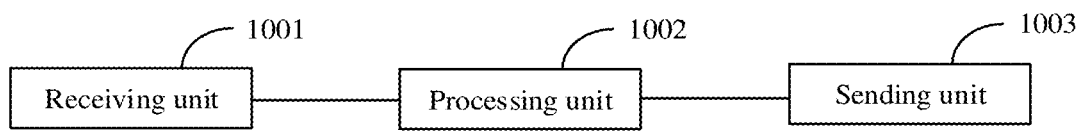

Based on a same inventive concept as the method embodiments, some embodiments further provides a communication apparatus, configured to perform the method performed by the unified data management network element or the UDM network element in the foregoing method embodiments. For related features, refer to the foregoing method embodiments. Details are not described herein again. As shown in FIG. 10, the apparatus includes a receiving unit 1001, a processing unit 1002, and a sending unit 1003.

The receiving unit 1001 is configured to receive a first request from a key management network element, where the first request includes a first identifier, and the first identifier is an anonymous identifier or a temporary identifier of a second terminal device.

The processing unit 1002 is configured to determine that the first request includes the first identifier; and after determining that the first request includes the first identifier, obtain a SUPI of the second terminal device based on the first identifier.

The sending unit 1003 is configured to send a first response to the key management network element, where the first response includes the SUPI of the second terminal device.

In some embodiments, when determining the SUPI of the second terminal device based on the anonymous identifier of the second terminal device, the processing unit 1002 obtains the SUPI of the second terminal device from a subscription identifier de-concealing network element based on the anonymous identifier of the second terminal device.

In some embodiments, when determining the SUPI of the second terminal device based on the temporary identifier of the second terminal device, the processing unit 1002 determines the SUPI of the second terminal device based on a stored correspondence between a SUPI and a temporary identifier of a terminal device and based on the temporary identifier of the second terminal device.

In some embodiments, the processing unit 1002 further allocates a temporary identifier to the second terminal device, and store a correspondence between the SUPI and the temporary identifier of the second terminal device. Subsequently, the sending unit 1003 sends the temporary identifier to the second terminal device via a proximity service network element.

In some embodiments, the processing unit 1002 further obtains, from the proximity service network element, a temporary identifier allocated by the proximity service network element to the second terminal device, and store a correspondence between the SUPI and the temporary identifier of the second terminal device.

In some embodiments, after obtaining the SUPI of the second terminal device based on the first identifier, the processing unit 1002 stores a correspondence between the first identifier and the SUPI of the second terminal device.

In some embodiments, before the processing unit 1002 stores the correspondence between the first identifier and the SUPI of the second terminal device, the receiving unit 1001 receives a first indication from the key management network element. The first indication indicates to store the correspondence between the first identifier and the SUPI of the second terminal device.

In some embodiments, before storing the correspondence between the first identifier and the SUPI of the second terminal device, the processing unit 1002 further determines, based on an attribute of the second terminal device, that the correspondence between the first identifier and the SUPI of the second terminal device is to be stored.

In some embodiments, the processing unit 1002 deletes, as notified by the key management network element, the correspondence between the first identifier and the SUPI of the second terminal device.

In some embodiments, the processing unit 1002 determines a GPSI of the second terminal device based on the SUPI of the second terminal device, and then include the GPSI of the second terminal device in the first response.

In some embodiments, the receiving unit 1001 further receives a subscriber identity resolution request from a session management network element. The subscriber identity resolution request includes a second identifier, and the second identifier is one of the following: the anonymous identifier of the second terminal device, the temporary identifier of the second terminal device, or the GPSI of the second terminal device. Subsequently, the processing unit 1002 determines the SUPI of the second terminal device based on the second identifier. Then, the sending unit 1003 sends a subscriber identity resolution response to the session management network element, where the subscriber identity resolution response includes the SUPI of the second terminal device.

In some embodiments, the receiving unit 1001 further receives an identifier resolution request from an access and mobility management network element. The identifier resolution request includes a second identifier, and the second identifier is one of the following: the anonymous identifier of the second terminal device, the temporary identifier of the second terminal device, or the GPSI of the second terminal device. Subsequently, the processing unit 1002 determines the SUPI of the second terminal device based on the second identifier. Then, the sending unit 1003 sends an identifier resolution response to the access and mobility management network element, where the identifier resolution response includes the SUPI of the second terminal device.

In some embodiments, the first request is a secure communication parameter obtaining request, and the first response is a secure communication parameter obtaining response.

In some embodiments, the first response includes the first identifier.

Figure 11:
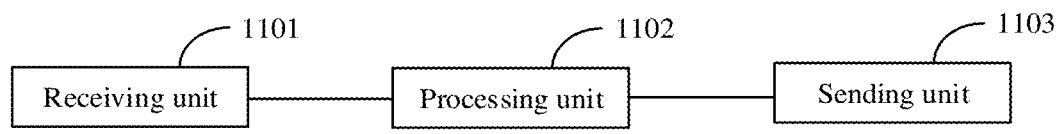

Based on a same inventive concept as the method embodiments, some embodiments further provides a communication apparatus, configured to perform the method performed by the session management network element or the SMF network element in the foregoing method embodiments. For related features, refer to the foregoing method embodiments. Details are not described herein again. As shown in FIG. 11, the apparatus includes a receiving unit 1101, a processing unit 1102, and a sending unit 1103.

The receiving unit 1101 is configured to receive a UE report message from a first terminal device, where the UE report message includes a second identifier and IP information allocated by the first terminal device to a second terminal device. The second identifier is one of the following: an anonymous identifier of the second terminal device, a temporary identifier of the second terminal device, or a GPSI of the second terminal device.

The processing unit 1102 is configured to determine that the UE report message includes the second identifier.

The sending unit 1103 is configured to: after the processing unit 1102 determines that the UE report message includes the second identifier, send a subscriber identity resolution request to a unified data management network element, where the subscriber identity resolution request includes the second identifier.

The receiving unit 1101 is further configured to receive a subscriber identity resolution response from the unified data management network element, where the subscriber identity resolution response includes a SUPI of the second terminal device.

The processing unit 1102 further performs service control on the second terminal device based on the SUPI and the IP information of the second terminal device.

Figure 12:
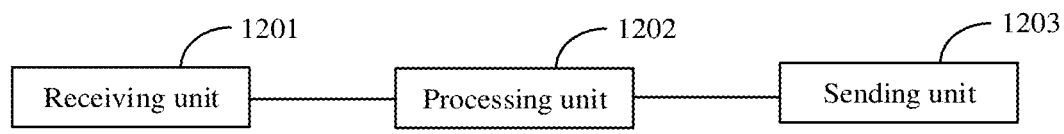

Based on a same inventive concept as the method embodiments, some embodiments further provides a communication apparatus, configured to perform the method performed by the access and mobility management network element or the AMF network element in the foregoing method embodiments. For related features, refer to the foregoing method embodiments. Details are not described herein again. As shown in FIG. 12, the apparatus includes a receiving unit 1201, a processing unit 1202, and a sending unit 1203.

The receiving unit 1201 is configured to receive a UE report message from a first terminal device, where the UE report message includes a second identifier and IP information allocated by the first terminal device to a second terminal device. The second identifier is one of the following: an anonymous identifier of the second terminal device, a temporary identifier of the second terminal device, or a GPSI of the second terminal device.

The processing unit 1202 is configured to determine that the UE report message includes the second identifier.

The sending unit 1203 is configured to: after the processing unit 1202 determines that the UE report message includes the second identifier, send an identifier resolution request to a unified data management network element, where the identifier resolution request includes a subscription permanent identifier SUPI of the second terminal device.

The receiving unit 1201 is further configured to receive an identifier resolution response from the unified data management network element, where the identifier resolution response includes the SUPI of the second terminal device.

The sending unit 1203 is further configured to send the SUPI and the IP information of the second terminal device to a session management network element.

Figure 13:
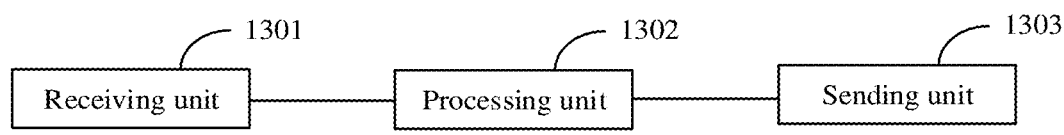

Based on a same inventive concept as the method embodiments, some embodiments further provides a communication apparatus, configured to perform the method performed by the first terminal device or the relay UE in the foregoing method embodiments. For related features, refer to the foregoing method embodiments. Details are not described herein again. As shown in FIG. 13, the apparatus includes a receiving unit 1301, a processing unit 1302, and a sending unit 1303.

The processing unit 1302 is configured to determine that direct communication is to be established with a second terminal device.

The sending unit 1303 is configured to: after the processing unit 1302 determines that direct communication is to be established with the second terminal device, send a first key request to a key management network element. The first key request includes a first identifier, and the first identifier is an anonymous identifier or a temporary identifier of the second terminal device.

The receiving unit 1301 is configured to receive a first key response from the key management network element, where the first key response includes a secure communication parameter.

The processing unit 1302 is further configured to establish secure communication with the second terminal device based on the secure communication parameter.

In some embodiments, the first key response further includes a GPSI of the second terminal device or the first identifier.

In some embodiments, division into the units is an example and is logical function division, and is other division during implementation. In addition, functional units in some embodiments are integrated into one processor, exists alone physically, or two or more units are integrated into one module. The foregoing integrated unit is implemented in a form of hardware, or is implemented in a form of a software functional module.

When the integrated unit is implemented in the form of a software functional unit and sold or used as an independent product, the integrated unit is stored in a computer-readable storage medium. Based on such an understanding, the technical solutions of embodiments essentially, or the part contributing to the current technology, or all or some of the technical solutions are implemented in a form of a software product. The computer software product is stored in a storage medium and includes several instructions for instructing a terminal device (which is a personal computer, a mobile phone, a network device, or the like) or a processor (processor) to perform all or some of the steps of the methods in some embodiments. The storage medium includes any medium that stores program code, such as a USB flash drive, a removable hard disk, a read-only memory (read-only memory, ROM), a random access memory (random access memory, RAM), a magnetic disk, or an optical disc.

In some embodiments, the key management network element, the unified data management network element, the session management network element, the access and mobility management network element, and the first terminal device each is presented by integrating function modules. The "module" herein is an ASIC, a circuit, a processor that executes one or more software or firmware programs, a memory, an integrated logic circuit, and/or another component capable of providing the foregoing functions.

Figure 14:
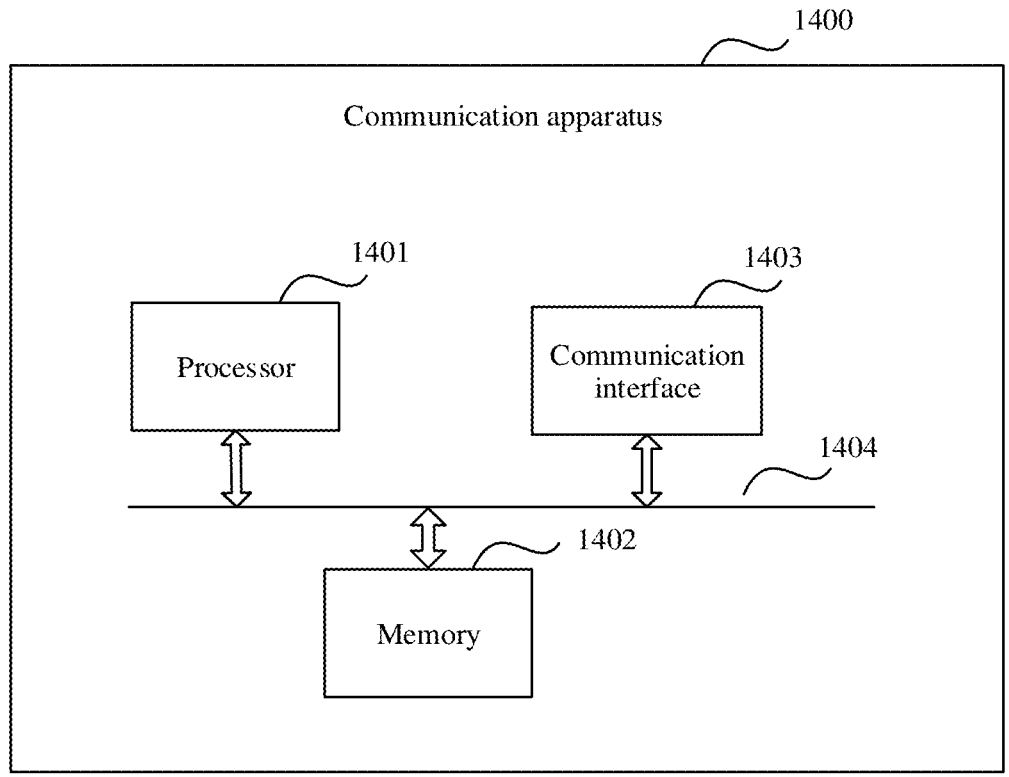

In some embodiments, the key management network element, the unified data management network element, the session management network element, and the access and mobility management network element each is in a form shown in FIG. 14.

A communication apparatus 1400 shown in FIG. 14 includes at least one processor 1401 and a memory 1402, and optionally, further includes a communication interface 1403.

The memory 1402 is a volatile memory, for example, a random access memory; or the memory is a non-volatile memory, for example, a read-only memory, a flash memory, a hard disk drive (hard disk drive, HDD), or a solid-state drive (solid-state drive, SSD); or the memory 1402 is any other medium that is used to carry or store expected program code in a form of an instruction or a data structure and that is accessed by a computer, but is not limited thereto. The memory 1402 is a combination of the foregoing memories.

In some embodiments, a connection medium between the processor 1401 and the memory 1402 is not limited. In some embodiments, in the figure, the memory 1402 and the processor 1401 are connected through a bus 1404. The bus 1404 is represented by a bold line in the figure. A connection manner between other components is described as an example and does not constitute any limitation. The bus 1404 is classified as an address bus, a data bus, a control bus, or the like. For ease of representation, one thick line is used to represent the bus in FIG. 14, but this does not mean that there is one bus or one type of bus.

The processor 1401 is configured to have a data transceiver function, and communicates with another device. In the apparatus in FIG. 14, an independent data transceiver module, for example, the communication interface 1403, is disposed for data sending and receiving. When communicating with another device, the processor 1401 performs data transmission through the communication interface 1403.

When the key management network element is in the form shown in FIG. 14, the processor 1401 in FIG. 14 invokes computer executable instructions stored in the memory 1402, so that the key management network element performs the method performed by the key management network element or the PKMF network element in any one of the foregoing method embodiments.

That is, functions/implementation processes of the sending unit, the receiving unit, and the processing unit in FIG.

9 is implemented by the processor 1401 in FIG. 14 by invoking the computer-executable instructions stored in the memory 1402. Alternatively, functions/implementation processes of the processing unit in FIG. 9 is implemented by the processor 1401 in FIG. 14 by invoking the computer-executable instructions stored in the memory 1402, and functions/implementation processes of the sending unit and the receiving unit in FIG. 9 is implemented by the communication interface 1403 in FIG. 14.

When the unified data management network element is in the form shown in FIG. 14, the processor 1401 in FIG. 14 invokes computer executable instructions stored in the memory 1402, so that the unified data management network element performs the method performed by the unified data management network element or the UDM network element in any one of the foregoing method embodiments.

That is, functions/implementation processes of the sending unit, the receiving unit, and the processing unit in FIG. 10 is implemented by the processor 1401 in FIG. 14 by invoking the computer-executable instructions stored in the memory 1402. Alternatively, functions/implementation processes of the processing unit in FIG. 10 is implemented by the processor 1401 in FIG. 14 by invoking the computer-executable instructions stored in the memory 1402, and functions/implementation processes of the sending unit and the receiving unit in FIG. 10 is implemented by the communication interface 1403 in FIG. 14.

When the session management network element is in the form shown in FIG. 14, the processor 1401 in FIG. 14 invokes computer executable instructions stored in the memory 1402, so that the session management network element performs the method performed by the session management network element or the SMF network element in any one of the foregoing method embodiments.

That is, functions/implementation processes of the receiving unit, the sending unit, and the processing unit in FIG. 11 is implemented by the processor 1401 in FIG. 14 by invoking the computer executable instructions stored in the memory 1402. Alternatively, functions/implementation processes of the processing unit in FIG. 11 is implemented by the processor 1401 in FIG. 14 by invoking the computer executable instructions stored in the memory 1402, and functions/implementation processes of the receiving unit and the sending unit in FIG. 11 is implemented by the communication interface 1403 in FIG. 14.

When the access and mobility management network element is in the form shown in FIG. 14, the processor 1401 in FIG. 14 invokes computer executable instructions stored in the memory 1402, so that the access and mobility management network element performs the method performed by the access and mobility management network element or the AMF network element in any one of the foregoing method embodiments.

That is, functions/implementation processes of the receiving unit, the sending unit, and the processing unit in FIG. 12 is implemented by the processor 1401 in FIG. 14 by invoking the computer executable instructions stored in the memory 1402. Alternatively, functions/implementation processes of the processing unit in FIG. 12 is implemented by the processor 1401 in FIG. 14 by invoking the computer executable instructions stored in the memory 1402, and functions/implementation processes of the receiving unit and the sending unit in FIG. 12 is implemented by the communication interface 1403 in FIG. 14.

Figure 15:
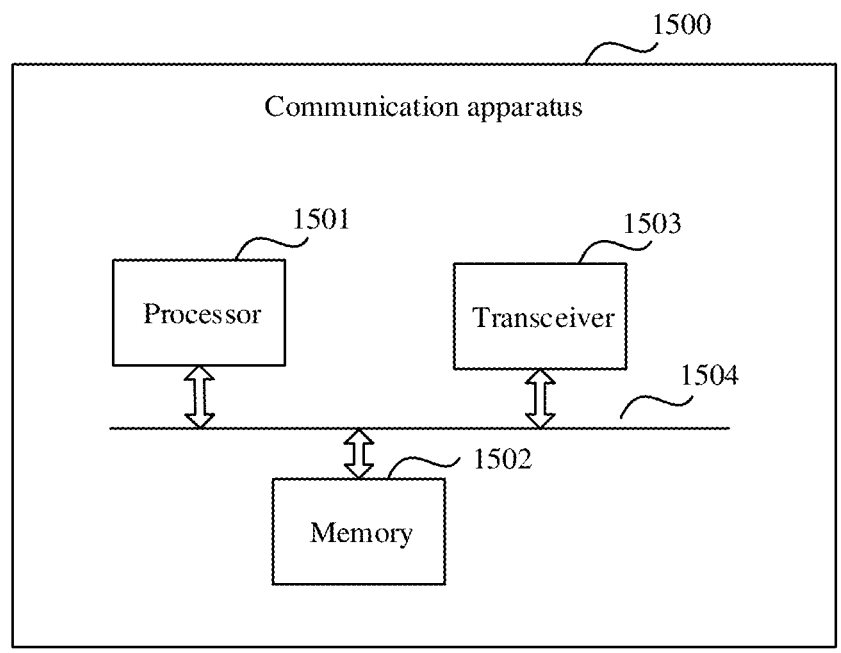

In some embodiments, a person skilled in the art figures out that the key management network element, the unified data management network element, the session management network element, and the access and mobility management network element each is in a form shown in FIG. 15.

A communication apparatus 1500 shown in FIG. 15 includes at least one processor 1501 and a memory 1502, and optionally, further includes a transceiver 1503.

The processor 1501 and the memory 1502 are similar to the processor 1401 and the memory 1402. For details, refer to the foregoing content. Details are not described herein again.

In some embodiments, a connection medium between the processor 1501 and the memory 1502 is not limited. In some embodiments, in the figure, the memory 1502 and the processor 1501 are connected through a bus 1504. The bus 1504 is represented by a bold line in the figure. A connection manner between other components is described as an example and does not constitute any limitation. The bus 1504 is classified as an address bus, a data bus, a control bus, and the like. For ease of representation, one thick line is used to represent the bus in FIG. 15, but this does not mean that there is one bus or one type of bus.

The processor 1501 is configured to have a data transceiver function, and communicates with another device. In the apparatus in FIG. 15, an independent data transceiver module, for example, the transceiver 1503, is disposed for data sending and receiving. When communicating with another device, the processor 1501 performs data transmission by using the transceiver 1503.

When the first terminal device is in the form shown in FIG. 15, the processor 1501 in FIG. 15 invokes computer executable instructions stored in the memory 1502, so that the first terminal device performs the method performed by the first terminal device or the relay UE in any one of the foregoing method embodiments.

That is, functions/implementation processes of the sending unit, the receiving unit, and the processing unit in FIG. 13 is implemented by the processor 1501 in FIG. 15 by invoking the computer-executable instructions stored in the memory 1502. Alternatively, functions/implementation processes of the processing unit in FIG. 13 is implemented by the processor 1501 in FIG. 15 by invoking the computer-executable instructions stored in the memory 1502, and functions/implementation processes of the sending unit and the receiving unit in FIG. 13 is implemented by the transceiver 1503 in FIG. 15.

A person skilled in the art understands that some embodiments are provided as a method, a system, or a computer program product. Therefore, some embodiments use a form of a hardware embodiment, a software embodiment, or an embodiment with a combination of software and hardware. Moreover, some embodiments use a form of a computer program product that is implemented on one or more computer-usable storage media (including but not limited to a disk memory, a CD-ROM, an optical memory, and the like) that include computer usable program code.

Some embodiments are described with reference to the flowcharts and/or block diagrams of the method, the device (system), and the computer program product. In some embodiments, computer program instructions are used to implement each process and/or each block in the flowcharts and/or the block diagrams and a combination of a process and/or a block in the flowcharts and/or the block diagrams. These computer program instructions are provided for a general-purpose computer, a dedicated computer, an embedded processor, or a processor of another programmable data processing device to generate a machine, so that the instructions executed by a computer or the processor of the another programmable data processing device generate an apparatus for implementing a function in one or more processes in the flowcharts and/or in one or more blocks in the block diagrams.

These computer program instructions alternatively is stored in a computer-readable memory that indicates a computer or another programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

These computer program instructions alternatively is loaded onto a computer or another programmable data processing device, so that a series of operations and steps are performed on the computer or the another programmable device, to generate computer-implemented processing. Therefore, the instructions executed on the computer or the another programmable device provide steps for implementing a function in one or more processes in the flowcharts and/or in one or more blocks in the block diagrams.

Clearly, a person skilled in the art is able to make various modifications and variations to embodiments without departing from the scope of the embodiments. In this way, is the embodiments are intended to cover these modifications and variations in the embodiments provided that they fall within the scope of protection defined by the following claims of this application and their equivalent technologies.

What is claimed is:

1. A communication system, comprises:
a unified data management network element; and
a key management network element configured to receive a first key request from a relay terminal device, wherein in response to determining that the first key request includes a subscription concealed identifier (SUCI) of a remote terminal device, send a first request to the unified data management network element, wherein the first request includes the SUCI of the remote terminal device;
wherein the unified data management network element is configured to receive the first request and in response to determining that the first request includes the SUCI of the remote terminal device, determine a subscription permanent identifier (SUPI) of the remote terminal device based on the SUCI of the remote terminal device and send a first response to the key management network element, wherein the first response includes the SUPI of the remote terminal device;
wherein the key management network element is further configured to receive the first response, perform an authorization check on the remote terminal device based on the SUPI of the remote terminal device, and in response to the authorization check on the remote terminal device being successful, send a first key response to the relay terminal device, wherein the first key response includes a secure communication parameter for establishing secure communication between the relay terminal device and the remote terminal device.

2. The system according to claim 1, wherein:
the first response and the first key response further include the SUCI of the remote terminal device; and
the unified data management network element is further configured to store a correspondence between the SUCI of the remote terminal device and the SUPI of the remote terminal device.

3. The system according to claim 2, wherein:
before storing the correspondence between the SUCI of the remote terminal device and the SUPI of the remote terminal device, the unified data management network element is further configured to receive a first indication from the key management network element, wherein the first indication indicates to store the correspondence between the SUCI of the remote terminal device and the SUPI of the remote terminal device; and
the key management network element is further configured to send the first indication to the unified data management network element.

4. The system according to claim 1, further comprises:
a session management network element configured to receive a user equipment (UE) report message from the relay terminal device, wherein the UE report message includes a second identifier and Internet protocol (IP) information allocated by the relay terminal device to the remote terminal device, and the second identifier is one or more of the following:
the SUCI of the remote terminal device;
a temporary identifier of the remote terminal device; or
a generic public subscription identifier (GPSI) of the remote terminal device; and
in response to determining that the UE report message includes the second identifier, send a subscriber identity resolution request to the unified data management network element, wherein the subscriber identity resolution request includes the second identifier;
the unified data management network element is configured to receive the subscriber identity resolution request, determine the SUPI of the remote terminal device based on the second identifier, and send a subscriber identity resolution response to the session management network element, wherein the subscriber identity resolution response includes the SUPI of the remote terminal device; and
the session management network element is further configured to receive the subscriber identity resolution response, and perform service control on the remote terminal device based on the SUPI of the remote terminal device and the IP information.

5. The system according to claim 4, further comprises:
an access and mobility management network element and the relay terminal device;
wherein the relay terminal device is configured to send the first key request to the key management network element, receive the first key response from the key management network element, and in response to establishing secure communication with the remote terminal device based on the secure communication parameter, send the UE report message to the session management network element via the access and mobility management network element.

6. The system according to claim 1, wherein:
the key management network element is further configured to receive a second key request from the relay terminal device, wherein the second key request requests the secure communication parameter from the key management network element, and the second key request includes an international mobile subscriber identity (IMSI) of the remote terminal device, perform an authorization check on the remote terminal device based on the IMSI of the remote terminal device, and in response to the authorization check on the remote terminal device being successful, send a second key response to the relay terminal device, wherein the second key response includes the secure communication parameter.

7. The communication system according to claim 1, wherein the determining the SUPI of the remote terminal device based on the SUCI of the remote terminal device comprises:
    obtaining the SUPI of the remote terminal device from a subscription identifier de-concealing network element based on the SUCI of the remote terminal device.

8. The communication system according to claim 1, wherein the relay terminal device configured to:
    send the first key request to the key management network element;
    receive the first response from the key management network element; and
    after establishing secure communication with the remote terminal device based on the secure communication parameter, send a UE report message to the session management network element via the access and mobility management network element.

9. A method for obtaining a terminal device identifier, comprising:
    receiving, by a key management network element, a first key request from a relay terminal device, wherein the first key request includes a subscription concealed identifier (SUCI) of a remote terminal device;
    in response to determining that the first key request includes the SUCI of the remote terminal, sending, by the key management network element, a first request to a unified data management network element, wherein the first request includes the SUCI of the remote terminal;
    receiving, by the key management network element, a first response from the unified data management network element, wherein the first response includes a subscription permanent identifier (SUPI) of the remote terminal device;
    performing, by the key management network element, an authorization check on the remote terminal device based on the SUPI of the remote terminal device; and
    in response to the authorization check on the remote terminal device being successful, sending a first key response to the relay terminal device, wherein the first key response includes a secure communication parameter for establishing secure communication between the relay terminal device and the remote terminal device.

10. The method according to claim 9, further comprising:
    in response to failure of the authorization check performed by the key management network element on the remote terminal device based on the SUPI of the remote terminal device, notifying, by the key management network element, the unified data management network element to delete a correspondence between the SUCI of the remote terminal and the SUPI of the remote terminal device.

11. The method according to claim 10, further comprising:
    sending, by the key management network element, a first indication to the unified data management network element, wherein the first indication indicates to store the correspondence between the SUCI of the remote terminal and the SUPI of the remote terminal device.

12. The method according to claim 9, further comprising:
    receiving, by the unified data management network element, the first request from the key management network element;
    in response to determining that the first request includes the SUCI of the remote terminal, obtaining, by the unified data management network element, the SUPI of the remote terminal device based on the SUCI of the remote terminal; and
    sending, by the unified data management network element, the first response to the key management network element.

13. The method according to claim 12, further comprising:
    receiving, by the unified data management network element, a subscriber identity resolution request from a session management network element, wherein the subscriber identity resolution request includes a second identifier, and the second identifier is one or more of the following:
        the SUCI of the remote terminal device;
        a temporary identifier of the remote terminal device; or
        a generic public subscription identifier (GPSI) of the remote terminal device;
    determining, by the unified data management network element, the SUPI of the remote terminal device based on the second identifier; and
    sending, by the unified data management network element, a subscriber identity resolution response to the session management network element, wherein the subscriber identity resolution response includes the SUPI of the remote terminal device.

14. The method according to claim 13, further comprising:
    receiving, by the session management network element, a user equipment (UE) report message from the relay terminal device, wherein the UE report message includes the second identifier and Internet protocol (IP) information allocated by the relay terminal device to the remote terminal device, and the second identifier is one or more of the following:
        the SUCI of the remote terminal device
        a temporary identifier of the remote terminal device or
        the generic public subscription identifier (GPSI) of the remote terminal device;
    in response to determining that the UE report message includes the second identifier, sending, by the session management network element, the subscriber identity resolution request to the unified data management network element; and
    receiving, by the session management network element, the subscriber identity resolution response from the unified data management network element; and
    performing service control on the remote terminal device based on the SUPI of the remote terminal device and the IP information.

15. The method according to claim 12, further comprising:
    receiving, by the unified data management network element, an identifier resolution request from an access and mobility management network element, wherein the identifier resolution request includes a second identifier, and the second identifier is one or more of the following:
        the SUCI of the remote terminal device;
        a temporary identifier of the remote terminal device; or
        a GPSI of the remote terminal device;
    determining, by the unified data management network element, the SUPI of the remote terminal device based on the second identifier; and sending, by the unified data management network element, an identifier resolution response to the access and mobility management network element, wherein the identifier resolution response includes the SUPI of the remote terminal device.

16. The method according to claim 13, wherein the determining the SUPI of the remote terminal device based on the SUCI of the remote terminal device comprises:
obtaining the SUPI of the remote terminal device from a subscription identifier de-concealing network element based on the SUCI of the remote terminal device.

17. The method according to claim 13, further comprising sending, by the relay terminal device, the first key request to the key management network element;
receiving, by the relay terminal device, the first response from the key management network element; and
after establishing secure communication with the remote terminal device based on the secure communication parameter, sending, by the relay terminal device, a UE report message to the session management network element via the access and mobility management network element.

18. A communication apparatus, comprising:
a processor; and
a memory that stores instructions, and in response to the processor executing the instructions, the processor is enabled to:
receive a first key request from a relay terminal device, wherein the first key request includes a first identifier subscription concealed identifier (SUCI) of a remote terminal device;
send a first request to a unified data management network element, wherein the first request includes the SUCI of the remote terminal;
receive a first response from the unified data management network element, wherein the first response includes a subscription permanent identifier (SUPI) of the remote terminal device; and
perform an authorization check on the remote terminal device based on the SUPI of the remote terminal device, and
in response to success of the authorization check on the remote terminal device, send a first key response to the relay terminal device, wherein the first key response includes a secure communication parameter for establishing secure communication between the relay terminal device and the remote terminal device.

19. The communication apparatus according to claim 18, wherein in further response to the processor executing the instructions, the processor is enabled to:
in response to failure of the authorization check performed by a key management network element on the remote terminal device based on the SUPI of the remote terminal device, notify the unified data management network element to delete a correspondence between the SUCI of the remote terminal and the SUPI of the remote terminal device.

* * * * *